United States Patent
Coombes et al.

(10) Patent No.: US 10,321,535 B2
(45) Date of Patent: Jun. 11, 2019

(54) DEVICES, SYSTEMS, AND METHODS FOR MAINTAINING LUMINAIRE COLOR TEMPERATURE LEVELS IN A GATEWAY BASED SYSTEM

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/809,739

(22) Filed: Nov. 10, 2017

(65) Prior Publication Data

US 2018/0098403 A1    Apr. 5, 2018

Related U.S. Application Data

(63) Continuation-in-part of application No. 15/785,808, filed on Oct. 17, 2017, now Pat. No. 10,021,757,
(Continued)

(51) Int. Cl.
*H05B 33/08* (2006.01)
*H05B 37/02* (2006.01)
(Continued)

(52) U.S. Cl.
CPC ..... *H05B 33/0869* (2013.01); *H04L 12/2803* (2013.01); *H04L 67/125* (2013.01);
(Continued)

(58) Field of Classification Search
None
See application file for complete search history.

(56) References Cited

U.S. PATENT DOCUMENTS 3,971,065 A    7/1976  Bayer
4,245,241 A    1/1981  Sato et al.
(Continued)

FOREIGN PATENT DOCUMENTS

CA    1315331 C    3/1993
CA    2594246 A1   1/2008
(Continued)

OTHER PUBLICATIONS

Lighting Research Center, Assist: Alliance for Solid-State Illumination Systems and Technologies, Feb. 15, 2005, 2 pages, http://www.lrc.rpi.edu/programs/solidstate/assist/index.asp.
(Continued)

*Primary Examiner* — Crystal L Hammond
(74) *Attorney, Agent, or Firm* — McBee Moore Woodward & Vanik IP, LLC

(57) ABSTRACT

The disclosure relates to devices, systems, and methods for adjusting and/or maintaining color temperature levels of luminaires. The luminaires may be Light Emitting Diode (LED)-based luminaires which are part of a smart illumination system. In certain exemplary embodiments, the disclosure includes a smart gateway device which is configured to control operation of a luminaire and is connected to a server, such as cloud server, over wired and/or wireless communication channels. The exemplary devices, systems, and methods adjust and maintain a color temperature of the luminaire according to desired or required specifications.

17 Claims, 25 Drawing Sheets

Related U.S. Application Data which is a continuation-in-part of application No. 15/424,868, filed on Feb. 5, 2017, now Pat. No. 9,992,843, which is a continuation-in-part of application No. 15/360,879, filed on Nov. 23, 2016, now Pat. No. 9,655,197.

(60) Provisional application No. 62/510,739, filed on May 24, 2017, provisional application No. 62/445,669, filed on Jan. 12, 2017, provisional application No. 62/306,636, filed on Mar. 11, 2016, provisional application No. 62/420,908, filed on Nov. 11, 2016, provisional application No. 62/521,817, filed on Jun. 19, 2017.

(51) Int. Cl.
*H04L 12/28* (2006.01)
*H04L 29/08* (2006.01)
*H04W 4/38* (2018.01)

(52) U.S. Cl.
CPC ..... *H05B 33/0851* (2013.01); *H05B 33/0893* (2013.01); *H05B 37/0218* (2013.01); *H05B 37/0254* (2013.01); *H05B 37/0272* (2013.01); *H04W 4/38* (2018.02); *Y02B 20/48* (2013.01)

(56) References Cited

U.S. PATENT DOCUMENTS

| | | | |
|---|---|---|---|
| 4,894,601 A | 1/1990 | Watkins | |
| 4,945,280 A | 7/1990 | Beghelli | |
| 5,154,504 A | 10/1992 | Helal et al. | |
| 5,770,928 A | 6/1998 | Chansky et al. | |
| 6,538,568 B2 | 3/2003 | Conley, III | |
| 7,045,964 B1 | 5/2006 | Hermans | |
| 7,248,297 B2 | 7/2007 | Catrysse et al. | |
| 7,608,807 B2 | 10/2009 | Hick et al. | |
| 7,777,427 B2 | 8/2010 | Stalker, III | |
| 7,893,632 B2 | 2/2011 | Meijer et al. | |
| 7,950,832 B2 | 5/2011 | Tanaka et al. | |
| 8,319,452 B1 | 11/2012 | Hamel et al. | |
| 8,442,785 B2* | 5/2013 | Walters ................. | G01R 31/44 315/134 |
| 8,643,304 B2 | 2/2014 | Hamel et al. | |
| 8,729,834 B1 | 5/2014 | Funderburk et al. | |
| 8,928,232 B2* | 1/2015 | Aggarwal .......... | H05B 37/0245 315/149 |
| 9,084,308 B2 | 7/2015 | Morrow | |
| 9,131,581 B1 | 9/2015 | Hsia et al. | |
| 9,148,936 B2 | 9/2015 | Wagner et al. | |
| 9,277,632 B2 | 3/2016 | Hegarty | |
| 9,408,280 B2 | 8/2016 | Schröder et al. | |
| 9,521,733 B2 | 12/2016 | Brand et al. | |
| 9,655,197 B1 | 5/2017 | Coombes et al. | |
| 2006/0237636 A1 | 10/2006 | Lyons et al. | |
| 2011/0254554 A1 | 10/2011 | Harbers | |
| 2012/0139417 A1 | 6/2012 | Mironichev et al. | |
| 2013/0181636 A1 | 7/2013 | Agrawal | |
| 2013/0193876 A1* | 8/2013 | Cleland ............. | H05B 37/0245 315/297 |
| 2014/0001962 A1 | 1/2014 | Harris | |
| 2014/0097758 A1 | 4/2014 | Recker et al. | |
| 2014/0320022 A1 | 10/2014 | Lee | |
| 2014/0375221 A1 | 12/2014 | Mans et al. | |
| 2015/0054410 A1 | 2/2015 | Sanders et al. | |
| 2015/0061498 A1 | 3/2015 | Paffrath et al. | |
| 2015/0130365 A1* | 5/2015 | Kim .................. | H05B 37/0272 315/209 R |
| 2015/0257243 A1* | 9/2015 | Saffari ............... | H05B 37/0272 315/113 |
| 2016/0003670 A1 | 1/2016 | Li et al. | |
| 2016/0014867 A1 | 1/2016 | Luk | |
| 2016/0036268 A1 | 2/2016 | Laherty et al. | |
| 2016/0088711 A1 | 3/2016 | Ng et al. | |
| 2016/0302273 A1 | 10/2016 | Wee et al. | |
| 2016/0360594 A1 | 12/2016 | Chemel | |
| 2017/0267175 A1 | 9/2017 | Ichikawa | |
| 2018/0299114 A1* | 10/2018 | Inan ................... | F21V 29/77 |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2380620 A | 4/2003 |
| GB | 2494151 A | 3/2013 |
| GB | 2534901 A | 8/2016 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.
Kevin Dowling, PhD, Lumen Maintenance IESNA LM-80-2008, Oct. 30, 2008, 16 pages, www1.eere.energy.gov/buildings/publications/pdfs/ssl/lm80-webcast_10-30-08.pdf.
Jeff McCullough, LC, Pacific NW National Lab, Energy Star® Webinar:Requirements for Lumen Maintenance, Oct. 30, 2008, 18 pages, www1.eere.energy.gov/buildings/publications/pdf.
M-Cam Patently Obvious, Kodak's Final Gasp? Intellectual Property Analysis of Kodak v Apple, HTC, Jan. 13, 2012, 8 pages, http://www.globalinnovationcommons.org.
Claire Swedberg, IoT Lights Up Streets With Smart City Initiative, RFiD Journal, Jul. 23, 2015, 3 pages, http://www.iotjournal.com/articles/view?13303.
DALI, Discover DALI—Excellent System Performance, Mar. 31, 2014, 5 pages, http://dali-ag.org/discover-dali.html.
International Search Report and Written Opinion of International Application No. PCT/IB2017/051390, dated May 31, 2017,13 pgs.
International Search Report and Written Opinion of International Application No. PCT/IB2017/051386, dated Jun. 6, 2017, 12 pgs.
International Search Report International App. No. PCT/IB2018/054387, dated Sep. 28, 2018, which is in the same family as U.S. Appl. No. 15/809,739, 3 pgs.
Written Opinion of International App. No. PCT/IB2018/054387, dated Sep. 28, 2018, which is in the same family as U.S. Appl. No. 15/809,739, 8 pgs.
IPO Combined Search and Examination Report of GB1806873.4, relevant to U.S. Appl. No. 15/809,739, dated Oct. 29, 2018, 8 pgs.
Written Opinion of International App. No. PCT/IB2018/058335, dated Feb. 22, 2019, relevant to U.S. Appl. No. 15/809,739, 10 pgs.
International Search Report of International App. No. PCT/IB2018/058335, dated Feb. 22, 2019, relevant to U.S. Appl. No. 15/809,739, 3 pgs.

* cited by examiner

DEVICES, SYSTEMS, AND METHODS FOR MAINTAINING LUMINAIRE COLOR TEMPERATURE LEVELS IN A GATEWAY BASED SYSTEM

CROSS-REFERENCE TO RELATED APPLICATIONS

This application claims the benefit of U.S. Provisional Patent Application Ser. No. 62/521,817 filed Jun. 19, 2017. This application is a continuation-in-part of and claims priority to U.S. patent application Ser. No. 15/785,808 filed Oct. 17, 2017, which claims the benefit of U.S. Provisional Patent Application Ser. No. 62/510,739 filed May 24, 2017 and is a continuation-in-part of and claims priority to U.S. patent application Ser. No. 15/424,868 filed Feb. 5, 2017, which claims the benefit of U.S. Provisional Patent Application Ser. No. 62/445,669 filed Jan. 12, 2017 and is a continuation-in-part of and claims priority to U.S. patent application Ser. No. 15/360,879 filed Nov. 23, 2016, now U.S. Pat. No. 9,655,197, which claims the benefit of U.S. Provisional Patent Application Ser. No. 62/306,636 filed Mar. 11, 2016. This application also claims the benefit of U.S. Provisional Patent Application Ser. No. 62/420,908 filed Nov. 11, 2016. The disclosures of all of the applications listed above are incorporated herein by reference in their entireties.

FIELD OF THE DISCLOSURE

The disclosure relates generally to commissioning and maintaining lighting systems. More specifically, the disclosure is directed to monitoring and maintaining the color temperature of a luminaire or group of luminaires in a lighting system using dimming controls and predicting the useful life of luminaires based on color temperature degradation of the luminaire.

BACKGROUND OF THE DISCLOSURE

The lifetime of traditional light sources (incandescent, fluorescent, and high-intensity discharge lamps) is estimated through industry-standard lamp rating procedures. The number is determined by an operation that runs a large, statistically significant sample of lamps until 50% have failed and that number of hours defines "rated life" for that lamp. Based on years of experience with traditional light sources, lighting experts can confidently use lamp life ratings, along with known lumen depreciation curves, to design the lighting for a space, and to determine equipment change schedules and economic payback. This aspect of predictive life or half-life of a light source is not true with Light Emitting Diodes (LED).

One reason why LED-based luminaires have gained popularity is because of their operational longevity and low power consumption. LEDs generally do not fail abruptly like traditional light sources; instead, their light output slowly diminishes over time. However, LED light sources can have such long lives that life testing and acquiring real application data on long-term reliability becomes problematic—for example, new versions of products are available before current ones can be fully tested. On top of that, LED light output and useful life are highly dependent on electrical and thermal conditions associated with the luminaire, associated systems, and the environment in which the luminaire is installed.

Digital intelligent lighting control systems can switch and dim individual luminaries in a light scene or space, such as an area within a building, which provides a great amount of flexibility, for example, setting appropriate LED output under particular conditions including the current LED lumen depreciation, to maintain desired levels of LED output. Such lighting control systems have user-friendly features for installation, programming, and operation. For example, lighting control systems can be integrated into a building management system as a subsystem of the central lighting controls.

A lighting control network generally includes one or more lighting devices; e.g., an electrical ballast including a luminaire, a light source such as an LED, and a dimmer, among other things. The dimmer must support specific interfaces for receiving control inputs for the luminaire/light source and dimming the light appropriately. Different lighting devices can support different control interfaces for dimming, e.g., to generate a particular color temperature as between different LED brands and/or powers.

The color temperature of a luminaire is the look and feel of the light produced by the luminaire. Color temperature is measured in degrees Kelvin (K) on a scale of 1000-10,000. Color temperature indicates, among other things, the color characteristic of lights coming out of luminaires located in an environment. In a typical commercial and/or residential environment, the luminaires' color temperatures fall between 2000K and 6500K. At the lower end of the scale, from 2000K to 3000K, the light produced is called "warm white" and ranges from orange to yellow-white in appearance. At the middle portion of the scale, from 3100K to 4500K, the light produced is called "cool white" or "bright white." Luminaires within this range emit a more neutral white light and may even have a slightly blue tint. Light produced above 4500K brings us to "daylight" color temperature of light. Luminaires with color temperatures of 4500K and above will give off a blue-white light that mimics daylight. The color temperature of the luminaire corresponds to the lumen level of the luminaire.

Current lighting control systems do not provide a system or method for allowing users to predict, after the fixture has been installed, when lumen degradation has occurred to the point where the light needs to be replaced.

For example, current lighting control systems include a Digital Addressable Lighting Interface (DALI®) protocol based system which includes a controller, a driver, and a signal converter. The DALI® system is capable of regulating color temperature of a luminaire by adjusting a dimming level of the luminaire so long as the luminaire is the same make and type throughout the entire system, which has been pre-designed around such luminaires.

At least one drawback of the DALI® system and other current systems is that current systems may use a single or a fixed dimming control technology which may not be adjusted during the life or state of degradation of a luminaire. Furthermore, these systems cannot control dynamic environments in which luminaires not present at the time of inception are introduced; that is, these systems must be developed and tested with the technology and parameters available during initial commissioning of the lighting system. There is no system learning capacity to dynamically integrate new luminaires and different types of LEDs, for example, with different powers, into the system.

Further, current techniques for controlling a dimming level of luminaires in a networked lighting system may require multiple standard protocols to accommodate different types of luminaires. The implementations of the techniques are accordingly varied and the resultant dimming levels of luminaires cannot be correlated across groups. For example, the color temperature of each luminaire may be individually controlled, e.g., every luminaire may have a sensor and a dimming control that can be set to a specific color temperature, but when a group of different types of luminaires occupy the same space, such as a single room, controlling the overall dimming level to produce a correct overall color temperature in the room is difficult. This problem is exacerbated as individual LEDs of particular luminaires respectively degrade at varying rates over time.

Thus, devices, systems, and/or methods for allowing a user who installs tens of thousands of luminaire systems to predict when and how much every luminaire has been degraded and/or adjust dimming level control over time provides enhanced convenience, control, and economics in lighting systems. The devices, systems, and methods may scale to very large numbers of luminaires at a global level. Such devices, systems, and methods may, for example, identify in real time the current state, such as ON/OFF, color temperature, and/or degradation state of at least one luminaire. For purposes of this disclosure, "real time" means substantial concurrency. "Real time" does not include any particular timeframe or limitation.

Such devices, systems, and methods may also be capable of maintaining the color temperature levels of each luminaire regardless of dimming protocols, type of luminaire, or environmental characteristics associated with the luminaire. Devices, systems, and methods which allow any dimming protocol to be used in the same space and yet generate a specific color temperature for the space provide further flexibility in lighting control systems.

For purposes of this disclosure, "protocol" means, for example and without limitation, one or more instructions, sequences, processes, algorithms, responses, or actions.

For purposes of this disclosure, "real time" means substantial concurrency and does not include any particular time frame or limitation.

For purposes of this disclosure, a "driver" is, for example and without limitation, a separate or integral device, system, mechanism, etc. for actuating, initiating, controlling, or communicating a command or operation as part of the exemplary disclosed devices, systems, and methods.

In view of the above, the disclosed devices, systems, and methods use lumen degradation, predictive life, dimming control and protocols, and environmental conditions of a luminaire, among other things, to dynamically generate, change, and/or maintain desired color temperatures for a luminaire, group of luminaires, or lighted space.

BRIEF DESCRIPTION OF THE EXEMPLARY EMBODIMENTS

The disclosed embodiments are generally related to devices, systems, and methods that generate, change, and/or maintain appropriate color temperature levels of one or more lights. The lights may be Light Emitting Diode (LED)-based luminaires which are part of a smart illumination system. In an exemplary embodiment the system includes, among other things, a gateway device that is connected to an LED-based luminaire and a server, such as a cloud server, over wired and/or wireless communication channels. The disclosed devices, systems, and methods may be used locally at a luminaire and/or via connected networks, such as Internet of Things (IoT) networks in a building or other space.

For purposes of this disclosure, the terms "device(s)", "system(s)", and "method(s)" may be used individually, separately, conjunctively, or collectively to describe the disclosed embodiments and aspects without limiting such descriptions.

In one or more exemplary embodiments, the disclosed systems and methods provide a system for controlling color temperature of a luminaire, including: a dimming control configured to control the dimming level and/or dimming protocol of the luminaire; at least one sensor subsystem configured to take color intensity readings of the luminaire and transmit the intensity readings to the server, either directly or via the gateway, if the color intensity readings are outside of a range expected by the sensor subsystem; and, a cloud server configured to calculate a color temperature of the luminaire based at least in part on the color intensity of the luminaire and determine whether the current dimming level and/or dimming control protocol of the luminaire needs to be adjusted to generate a desired color temperature and, if so, instruct the gateway how to adjust at least one of the dimming level and dimming control protocol of the luminaire to generate a desired color temperature. The cloud server calculates the color temperature, in part, by correlating the current color intensity and dimming level of the luminaire to a previous and/or initial color intensity and dimming level, and associated color temperature, of the luminaire.

In various aspects, the cloud server can instruct the gateway to adjust the dimming control to adjust the color temperature of the luminaire so as to keep the color temperature of the luminaire constant over time or keep the color temperature of the luminaire at user-set preferences. Additionally, the cloud server can optionally instruct the gateway to adjust the dimming control to adjust the color temperature of the luminaire in response to pre-scheduled changes (which may include changes in ambient background lighting over the course of a day).

In one embodiment, the system will notify the user when a luminaire can no longer maintain user preferences. The system measures the color temperature and when color performance falls below a certain level, the user will be notified that specific luminaires must be replaced in order to maintain preferences. This embodiment in accordance with the disclosed system allows a user to change a device in the system without impacting the color temperature of the newly replaced device or space in which the device resides. The system will access information stored on cloud servers that will cause the new/modified luminaire introduced into the system to automatically adopt and adjust to previously defined user preferences.

In another aspect, the disclosed systems and methods calculate at least one of a half-life or end of life for a luminaire based at least in part on at least one of a color temperature change of the luminaire over time and/or a comparison of the current color temperature and dimming level of the luminaire to a correlation between a previous color temperature and dimming level. In the same or different embodiments, the systems and methods include a luminaire database that collects information related to a luminaire including at least one of fitting and dimming components and test data, sensor reading ranges, and sensor readings from a sensor subsystem including time, dimming level, and temperature of each reading, and a server predicts and generates luminaire degradation profiles over time based on the information in the luminaire database.

BRIEF DESCRIPTION OF THE FIGURES

A more particular description will be rendered by reference to specific embodiments thereof that are illustrated in the appended drawings. Understanding that these drawings depict only exemplary embodiments thereof and are not therefore to be considered to be limiting of its scope, exemplary embodiments will be described and explained with additional specificity and detail through the use of the accompanying drawings in which.

DETAILED DESCRIPTION OF THE EXEMPLARY EMBODIMENTS

Figure 1:
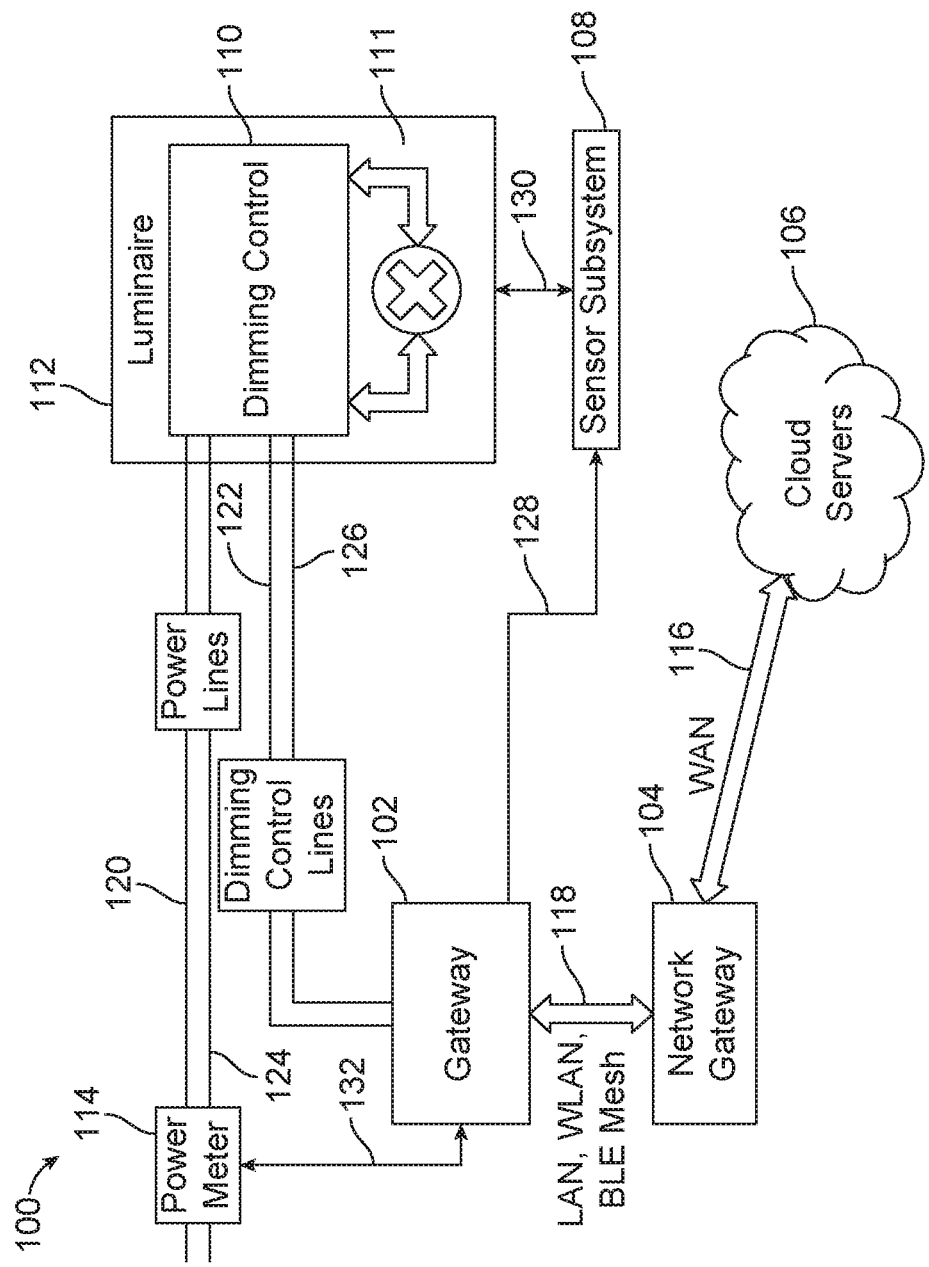
FIG. 1 illustrates a high-level system diagram of the universal smart lighting gateway.

The headings used herein are for organizational purposes only and are not meant to be used to limit the scope of the description or the claims. As used throughout this disclosure, the word "may" is used in a permissive sense (i.e., meaning having the potential to), rather than the mandatory sense (i.e., meaning must). Similarly, the words "include", "including", and "includes" mean including but not limited to. To facilitate understanding, reference numerals have been used, where possible, to designate like elements common to the figures.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

Reference will now be made in detail to various embodiments. Each example is provided by way of explanation, and is not meant as a limitation and does not constitute a definition of all possible embodiments.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are disclosed, it should be appreciated those individual aspects of the disclosed embodiments can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, Non-Volatile Random Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and equivalents and/or successor media, in which the software implementations of the disclosure are stored.

Figure 2:
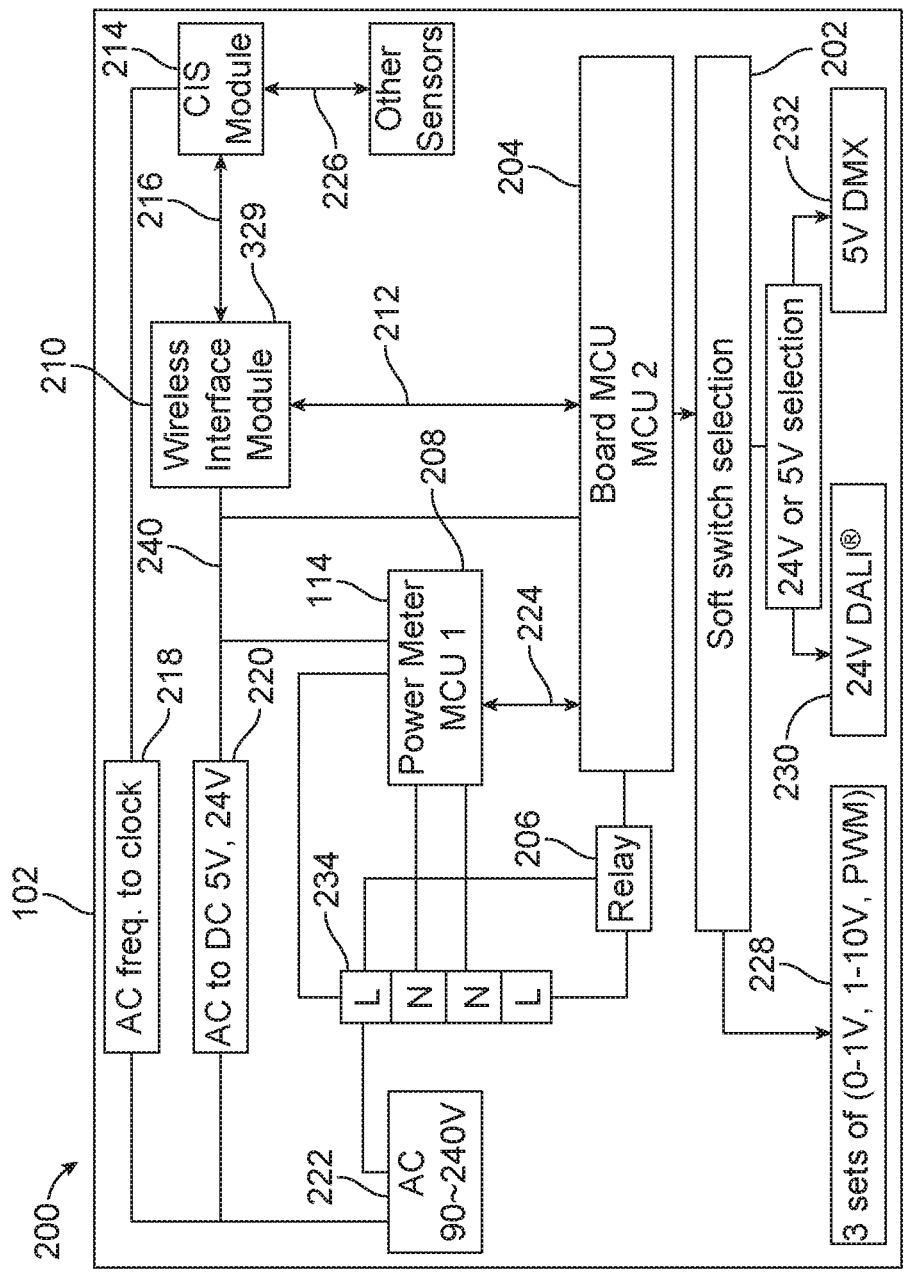
FIG. 2 illustrates an embodiment of the universal smart lighting gateway box diagram.
Figure 3:
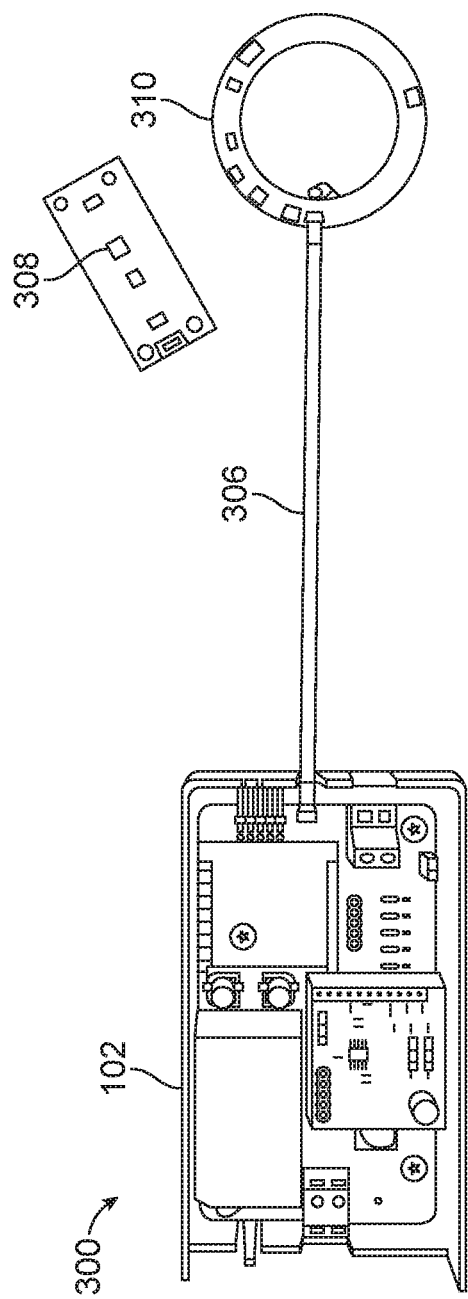
FIG. 3 illustrates an embodiment of the sensor connection to the luminaire.
Figure 9:
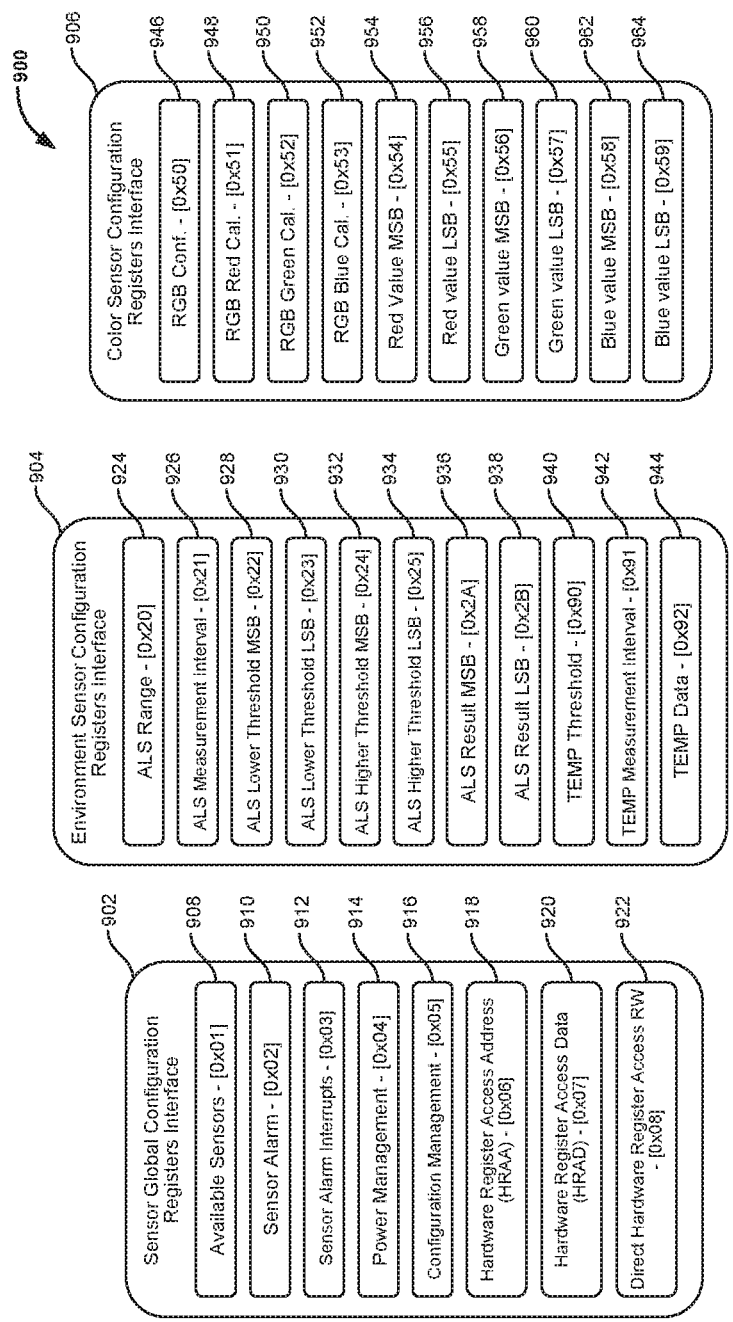
FIG. 9 depicts an embodiment of sensor interfaces data structures.

FIG. 1 shows an exemplary embodiment of a system 100 for maintaining color temperature of a luminaire. One or more components of the system 100 may be installed in an environment such as a building, room, hallway, or any other space in which lighting is desired. In the exemplary embodiment shown in FIG. 1, a Universal Smart Lighting Gateway 102 ("gateway 102") is communicatively connected via wired or wireless communication channels to, among other things, a luminaire 112. Luminaire 112 is a system that can be single or multiple luminaires connected with a single common interface to power lines 120, 124 and dimming control lines 122, 126. In the exemplary embodiment shown in FIG. 1, luminaire 112 includes associated LED 111. There is a power meter 114 that is connected electrically between the gateway 102 and the luminaire 112 on the power lines 120, 124. The power meter 114 is connected to the gateway 102 via the power meter interface 132 and can measure and communicate the electrical power drawn by the luminaire in real time. FIGS. 2 and 9 demonstrate the power meter 114 connections in more detail. There is a sensor subsystem 108 that is communicatively connected to the luminaire 112 on one side and to the gateway 102 on the other side. The connection 130 to the luminaire 112 may be physical or wireless and is not limited to a specific location. The location of the sensor subsystem 108 and/or associated sensors may be different for various types of sensors that need to be positioned. FIG. 3 demonstrates one embodiment of sensor physical interface and connections including the sensor interface 128 to the gateway 102.

With continuing reference to FIG. 1, cloud servers 106 are continuously receiving performance measurements for one or more luminaires from one or more gateways such as gateway 102. In one embodiment the cloud servers 106 reciprocally provide every gateway 102 and/or sensor subsystem 108 with a table of reading directions that includes expected ranges of color intensity readings for particular luminaires at specific dimming levels, as explained further below. In the exemplary embodiment shown in FIG. 1, information may be exchanged between the servers 106 and the sensor subsystem 108 via gateway 102. In the same or other embodiments, the sensor subsystem 108 and servers 106 may communicate directly by, for example, a wireless connection between the sensor subsystem 108 and network gateway 104 (discussed further below). The sensor subsystem 108 thereby determines whether a color intensity reading of the luminaire 112 is outside of the expected range and, if so, transmits the color intensity reading to the cloud server(s) 106 either directly or via the gateway 102. Transmitting only color intensity readings that are outside of the expected range reduces the amount of information that needs to be transmitted over a gateway backhaul 118, as shown in FIG. 1. In this way the cloud server applications can control the rate of information sent by the sensor subsystem 108/ gateway 102 and more accurately predict the luminaire 112/LED 111 behavior. In the same or other embodiments, sensor readings and other information may be sent over the backhaul 118 to the cloud server 106 at random times. Such messages may include a time stamp of the subject sensor reading and current dimming level of the luminaire 112.

The backhaul interface 118 to the gateway 102 can be a wired or wireless Local Area Network (LAN, WLAN), including possibly one or more of Mesh Bluetooth Low Energy (Mesh BLE), ZigBee, and/or Ethernet LAN. In one embodiment this interface is Mesh BLE. The gateway 102 is connected with a network gateway 104 which resides between the local networks to a wide area network (WAN) 116, and via this WAN 116 to cloud computers/servers 106 for operational and management interfaces.

FIG. 2 depicts an exemplary embodiment 200 of the Universal Smart Lighting Gateway 102. FIG. 2 illustrates a soft switch 202 to select between different electrical dimming interfaces. This soft switch 202 may be actively used in the search for the correct dimming protocol between the gateway 102 and the dimming luminaire 112 (not shown in this figure) to set desired dimming levels and generate desired color temperatures of the luminaire 112. The protocol modules 228, 230, and 232 are the software implementation of the dimming interfaces that reside in the gateway 102. In one embodiment the supported dimming protocol includes several sets of protocols 0V-10V, 1V-10V, pulse width modulation (PWM) 228 protocols over 0V-10V and/ or 1V to 10V, a 24V DALI 230 protocol, and a 5V digital multiplex (DMX) 232 protocol. The protocols' algorithms may be implemented in the Micro Controller Unit 2 (MCU-2) 204. According to an embodiment, the MCU-2 204 is powered by the AC to DC 5V, 24V 220 via the power line connection 240. MCU-2 204 is also connected to a power meter 114 via MCU 1 and a Universal Asynchronous Receiver/Transmitter (UART) 224. MCU-2 may also be connected to a Relay 206 and/or a Wireless Interface Module (WIM) 210 via a Serial Peripheral Interface (SPI) bus 212. In an embodiment, the MCU-2 204 is also controlling the Relay 206 that is designed to be able to cut off the current to the luminaire 112 upon a decision by the MCU-2 204. The power cutoff can be used to disconnect power from the controlled luminaire subsystem (See FIG. 1). In an embodiment the Wireless Interface Module (WIM) 210 is implemented as Bluetooth Low Power (BLE) device using Mesh BLE protocol to connect with other devices as well having SPI bus 212 and Inter-Integrated Circuit two-wire serial interface bus ("TWSI") 216. The WIM 210 may be connected to a sensor subsystem that may include a Camera Interface System (CIS) 214, which in the exemplary embodiments may include an environmental sensor and, for example, a Red-Green-Blue (RGB) and/or Yellow-Red-Green-Blue (YRGB) sensor combination device and other sensors. The CIS module 214 can be extended via Two-Wire Serial Interface ("TWSI") bus 226 with other sensor modules. The CIS module 214 requires a clock, which is received via the AC Frequency to clock module interface 218. The WIM 210 requires power, which may be received via the AC to DC 5V to 24V 220 via power interface line 240. The AC Power 90V-240V 222 may be relayed to the MCU-2 204 and from it to the soft switch 202 for power selection for the dimming protocol interfaces. The AC Power 222 is also relayed to the power meter 114 which measures all power delivered to the luminaire. The LNNL 234 depicts the physical electrical line connections.

FIG. 3 depicts an embodiment 300 of the sensors—CIS module 308 or 310—and the physical interface with the gateway 102 via Two-Wire Serial Interface (TWSI) connection using a 6-pin FPC cable and connector 306. The exemplary CIS module (308, 310) shown in FIG. 3 is physically connected somewhere on the luminaire 112. The exemplary CIS module 308 is a linear module that can be adopted to fit on devices that require a linear fitting, while the exemplary CIS module 310 is circular and is designed to fit circular luminaire modules. The CIS module(s) may take any required shape to fit with a particular luminaire.

In the exemplary embodiment shown in FIG. 3, CIS module 310 is physically connected to gateway 102 via connection 106. The CIS module may also be in wireless communication with the gateway 102 without departing from the scope of the disclosure. Further, the disclosed embodiments do not limit the type of hardware/wire/bus interfaces between the gateway 102 and the sensor subsystem 108 or devices (CIS module 308, 310), e.g., the number of wires, the type of wires or bus connectors. The connections may be, for example and without limitation, analog interface connectors and/or electrical/digital bus connectors of any kind.

In the exemplary disclosed embodiments, the CIS modules 308 and/or 310 may be provided with at least two or more sensors; one sensor is dedicated to environment sensing and one sensor which may be a color sensor configured to measure one or more aspects of a light source. The environment sensor is configured to face away or in a downward direction (i.e., "downward looking" or "down looking") from the luminaire 112 and measure environmental conditions such as ambient light, temperature, humidity, motion, and/or the number of people passing through or present ("footfall") in the environment in which the luminaire 112 is installed. The environment sensor may be a low resolution imaging sensor which could be an array of sensors combined into a low resolution imaging device, or a single Application-Specific Integrated Circuit (ASIC) that is an imaging sensor. In the disclosed or other embodiments, the environment sensor may include three or more different sensors: a low-resolution image sensor, an ambient light sensor, and a temperature sensor (collectively, the "environment sensor"). In the exemplary disclosed embodiments, the environment sensor is configured to measure at least ambient light and temperature of the environment.

The color sensor faces the luminaire directly (i.e., the color sensor is "up looking" or "upward looking") and measures, for example, color content and/or intensity of the light source. In the exemplary disclosed embodiments, the color sensor includes at least one Red Green Blue (RGB) sensor. In the same or other embodiments, the color sensor includes a Yellow Red Green Blue (YRGB) sensor and/or other color sensors consistent with this disclosure. The RGB sensor or combination of sensors can measure multiple color channels (e.g., Red, Green, Blue, and/or Yellow) as they directly face the luminaires. The RGB sensor may be used to measure both the color content of a light source and color intensity. In an exemplary embodiment, an RGB sensor measures and communicates to the server 106, either directly or via gateway 102, the color intensity of luminaire 112 relative to other luminaires, regardless of power or dimming level. This is due to the RGB sensor facing luminaire 112 directly and allows for an accurate maintenance of a color temperature when the luminaire capacity is diminishing over time as well as during changes between different standards in the dimming control. For example, the system obviates using the dimming level to calculate color intensity or color temperature because the RGB sensor directly provides the color intensity to the server 106, which calculates color temperature based in part on the color intensity and determines whether and/or how color temperature will be maintained via the dimming control.

In an aspect, calibration of the color sensor(s) may be such that the depreciation of a sensor follows a known graph, which was studied for the specific color sensor (e.g., complementary metal-oxide-semiconductor (CMOS)). The sensor readings may also be normalized over time by plotting successive readings. Thus, two different color CMOS sensors that are attached to the same luminaire in different physical attachment locations on the fitting may have different absolute color intensity readings, such as for red, green, blue, and/or yellow based on their relative positions, yet the normalized values of the percent change in color intensity read by each individual sensor will be accurate. For example, red intensity is read respectively as x1 and y1 at each of two sensors at time t1 and, at t2, x2 and y2. In the example, $x2/x1 = y2/y1 + w$, where $w \ll 1$ and each sensor reads an accurate change in red intensity between t1 and t2. Therefore, the exemplary systems and methods can correlate an exponential relationship between color intensity and lumen intensity of the LED, via normalization. This relationship may be known and/or calculated by the cloud server 106.

Figure 3B:
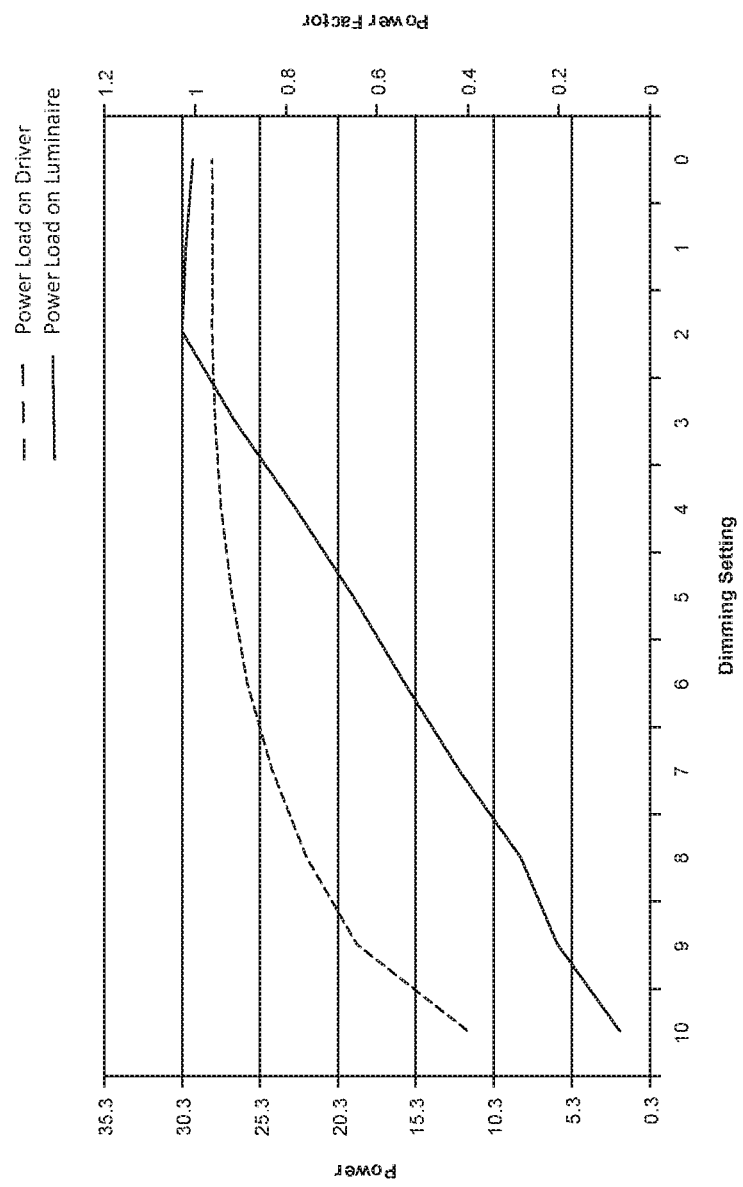
FIG. 3B is graph showing power factor vs. power consumption, according to an aspect.

FIG. 3B shows a representative plot of the power factor and power load of a luminaire driver and luminaire combination against the dimming setting of the luminaire, where 0 is minimum dimming (i.e., the luminaire is at maximum brightness) and 10 is maximum dimming (i.e., the luminaire is at minimum brightness). The power factor is the sum of the power load on the luminaire and the driver. FIG. 3B also shows the associated power consumption at each dimming setting. In general, as shown in FIG. 3B, the power factor significantly decreases as the dimming level of the luminaire increases and the associated power consumption decreases. The representative graph shown in FIG. 3B indicates that the driver becomes inefficient at lower dimming levels because the power load on the driver is staying relatively constant while the amount of light varies according to the different dimming levels. The details of the depicted correlations will likely vary between different brands and types of luminaires, and even between luminaires of the same brand and type due to manufacturing tolerances.

FIGS. 3C-3G depict various representative dimming curves for a luminaire/luminaire driver combination including a dimming control/circuit. Unlike a switching circuit where a light level can be toggled directly between 0% output (off) to 100% (on), a dimming circuit can vary the light output between minimum and maximum outputs. The light level produced at different dimming levels depends on a number of factors including, but not limited to, the brand and type of the luminaire and/or luminaire driver, the conditions of the environment in which the luminaire is installed, and the dimming protocol according to which the luminaire driver is operating. For example, the dimming devices may not necessarily dim to 0% output, such as in the case of 1-10V dimmers which typically require a switching circuit to reach 0% output. Various luminaires and/or luminaire drivers on the market may state the lowest dimming value that the luminaire or luminaire/driver combination can output according to their dimming protocol, which may be one or more of any number of, e.g., analog or digital LED lighting control protocols. Each such protocol will dim the lighting in a particular way and the dimming profile may be represented graphically as dimming level versus light output. Certain representative dimming curves are shown in FIGS. 3C-3G and explained further below. In FIGS. 3C-3G, dimming levels increase in a direction from 0 to 100; that is, a dimming level of 0 is a minimum dimming (maximum brightness of the luminaire) and a dimming level of 100 is a maximum dimming (minimum brightness of the luminaire).

Figure 3C:
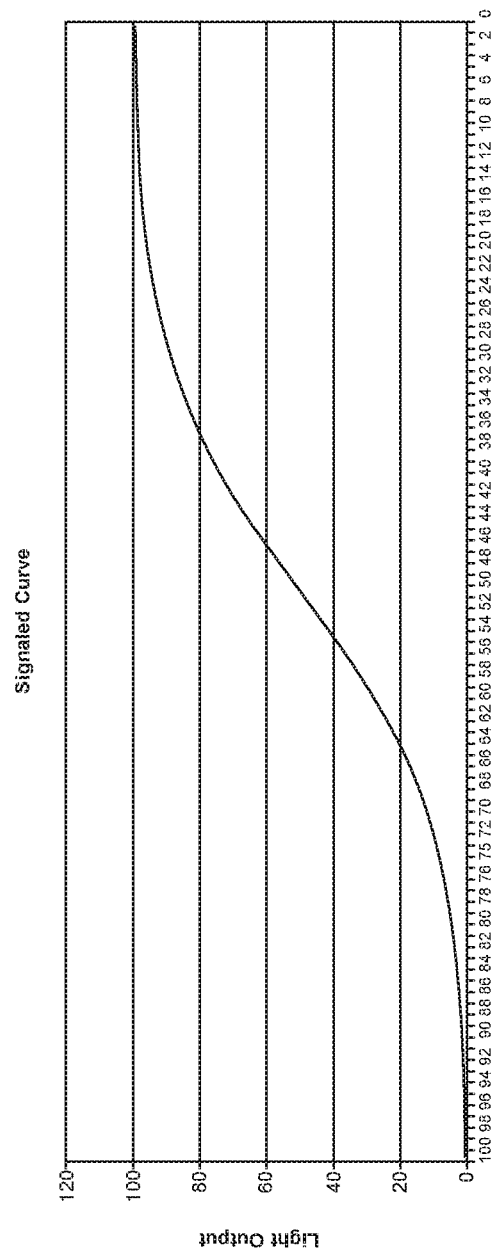
FIG. 3C is graph showing S curve, according to an aspect.

FIG. 3C shows Signaled (S) Curve dimming. A representative S Curve will be either a digitally-set dimming curve or the result of a PWM dimming protocol, e.g., for an LED light source. PWM dimming is typically found in DMX lighting control and/or systems where the dimming control is driven by a Triode for Alternating Current (TRIAC), Metal-Oxide-Semiconductor Field-Effect Transistor (MOSFET), or a similar gate/timer device for high voltage/current LEDs. PWM has a greater biological effects of flicker due to the switching frequency of the PWM. For example, the flicker may cause psychological issues for humans and growth problems in plants The S Curve (sigmoid curve) is calculated as follows:

$$Y = \frac{100}{1 + e^{-0.1(x-50)}} \quad \text{(eq. 1)}$$

where:

X=Dimming value (%)

Figure 3D:
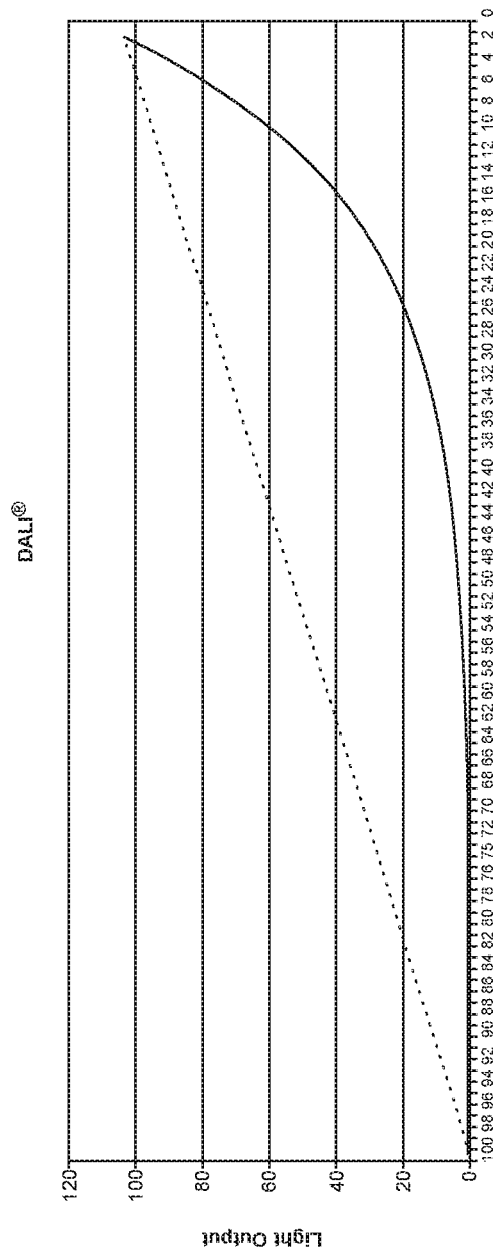
FIG. 3D is graph showing DALI® logarithmic curve, according to an aspect.

FIG. 3D shows a DALI® dimming curve according to the DALI® Standard (International Electrotechnical Commission (IEC) 62386). DALI® dimming commands are sent to the LED driver as a digital 8-bit number and follow a logarithmic dimming pattern. The logarithmic approach factors in an aspect of the Weber-Fechner Law: to the human eye a dimming curve such as shown in FIG. 3D will be perceived as a linear increase of light output, as represented by the dotted line. To normalize the DALI® dimming commands against other dimming curves, the 8-bit command may be converted to a percentage dimming value. The DALI® Logarithmic Curve is calculated as follows:

$$Y = 10^{\left(\frac{x-1}{253/3}\right)} \quad \text{(eq. 2)}$$

where:

$$n = \frac{X}{100} \times 254 \quad \text{(eq. 3)}$$

X=Dimming Value (%)

Figure 3E:
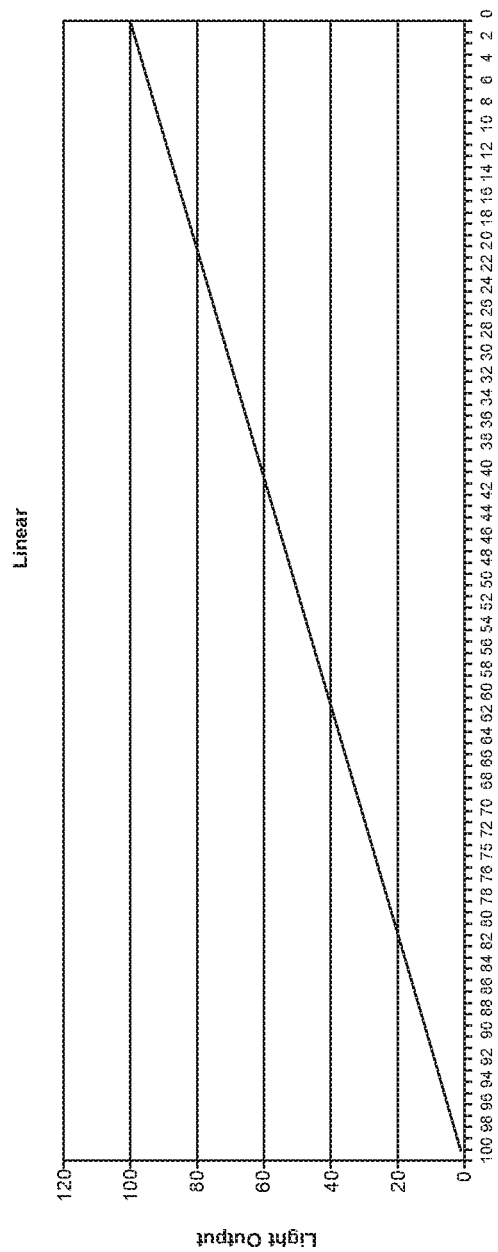
FIG. 3E is graph showing linear dimming curve, according to an aspect.

FIG. 3E shows a representative linear dimming curve. A linear dimming curve as shown in FIG. 3E is calculated as follows:

$$Y=X \quad \text{(eq. 4)}$$

where X=Dimming Value (%)

Figure 3F:
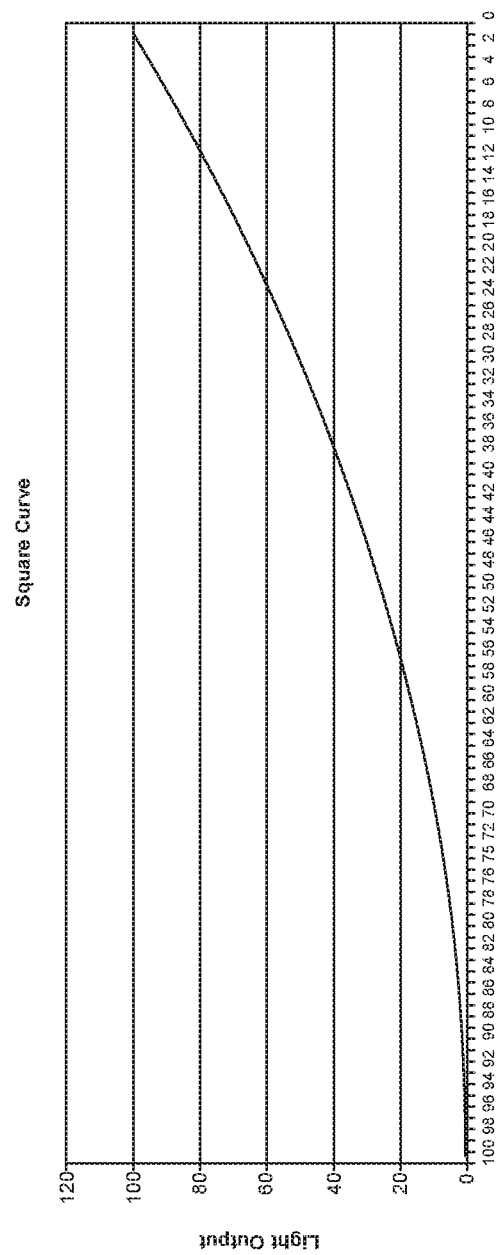
FIG. 3F is graph showing square curve, according to an aspect.

FIG. 3F shows a square curve dimming profile. A square curve as shown in FIG. 3F is calculated as follows:

$$Y = \frac{X^2}{100} \quad \text{(eq. 5)}$$

where X=Dimming Value (%)

Figure 3G:
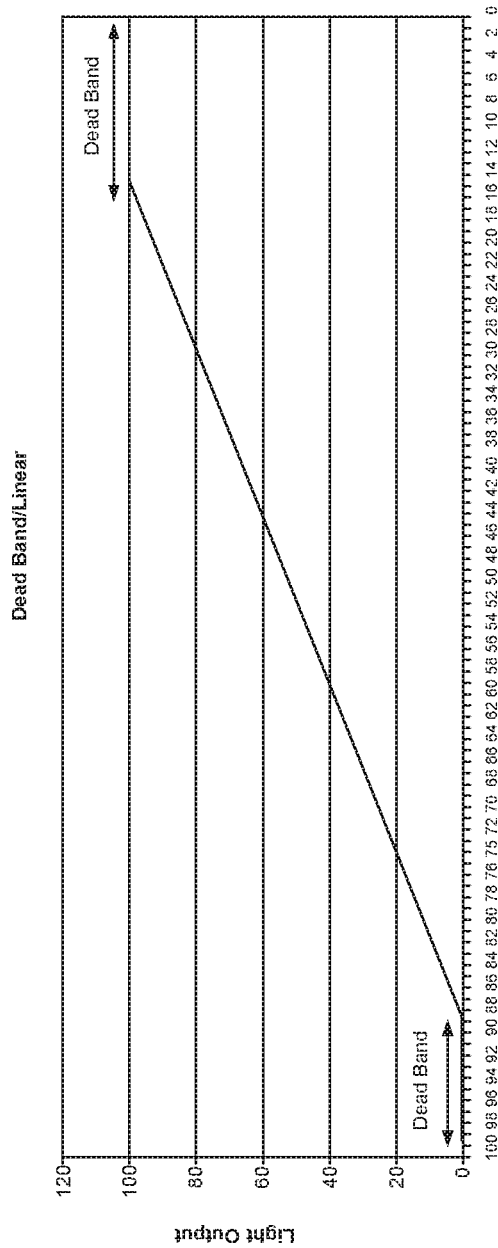
FIG. 3G is graph showing dead band vs. dimming value, according to an aspect.

FIG. 3G shows a representative linear Dead Band dimming curve. Dead Band refers to dimming levels at which the dimmer is adjusted but there is no (actual or perceived) change in brightness of the luminaires/LEDs. As shown in FIG. 3G, Dead Band can occur at both the low and high end of the dimming range. Dead Band may also occur in the middle of the dimming range (referred to as Dead Travel), although this is not depicted in the representative curve shown in FIG. 3G. Unintended Dead Band/Travel may be the result of any number of factors affecting the electrical and mechanical aspects of the luminaire/driver including, but not limited to, the brand and/or type of luminaire/driver, conditions in the environment in which the luminaire/driver is installed, voltage of the power source supplying the luminaire/driver, and the elapsed life and number of dimming cycles that the luminaire/driver has experienced. Dead Band and/or Dead Travel may affect analog or digital dimming controls including the DALI® and 0-10V LED drivers mentioned above. Dead Travel is more typical of resistive dimming devices but can be found in digital systems dependent on driver performance/quality.

Within a lighting installation, many luminaires having a variety of different dimming curves may be present across the same or different spaces. Accordingly, identifying and normalizing all the dimming curves will be essential to ensuring smooth lighting installation and operation. For example, maintaining a desired light level or color temperature in a room with multiple luminaires depends on correlating changes to the overall light level or color temperature to a potential change in the dimming level of any particular luminaire. As shown in FIGS. 3C-3G, the same percentage change in dimming level for different luminaires having different dimming curves may result in incongruous changes in light level or color temperature contributed by each luminaire.

There are a variety of fixed dimming curves available and different control protocols and/or LED drivers that will follow their manufacturer's set profiles. The curves in FIGS. 3C-3G are illustrative and the nature of a dimming curve for any particular luminaire or luminaire/driver combination may not follow those figures. For example, some device(s) may have a driver-specific, irregular curve as a result of resistive and/or TRIAC dimming of LEDs. As described further below, the exemplary disclosed embodiments normalize the various dimming curves of luminaires/drivers across a lighting system and therefore provide dynamic control over each luminaire/driver and the spaces in which they are installed to maintain, e.g., light levels or color temperature and maximize the life of the luminaires/drivers.

Figure 3H:
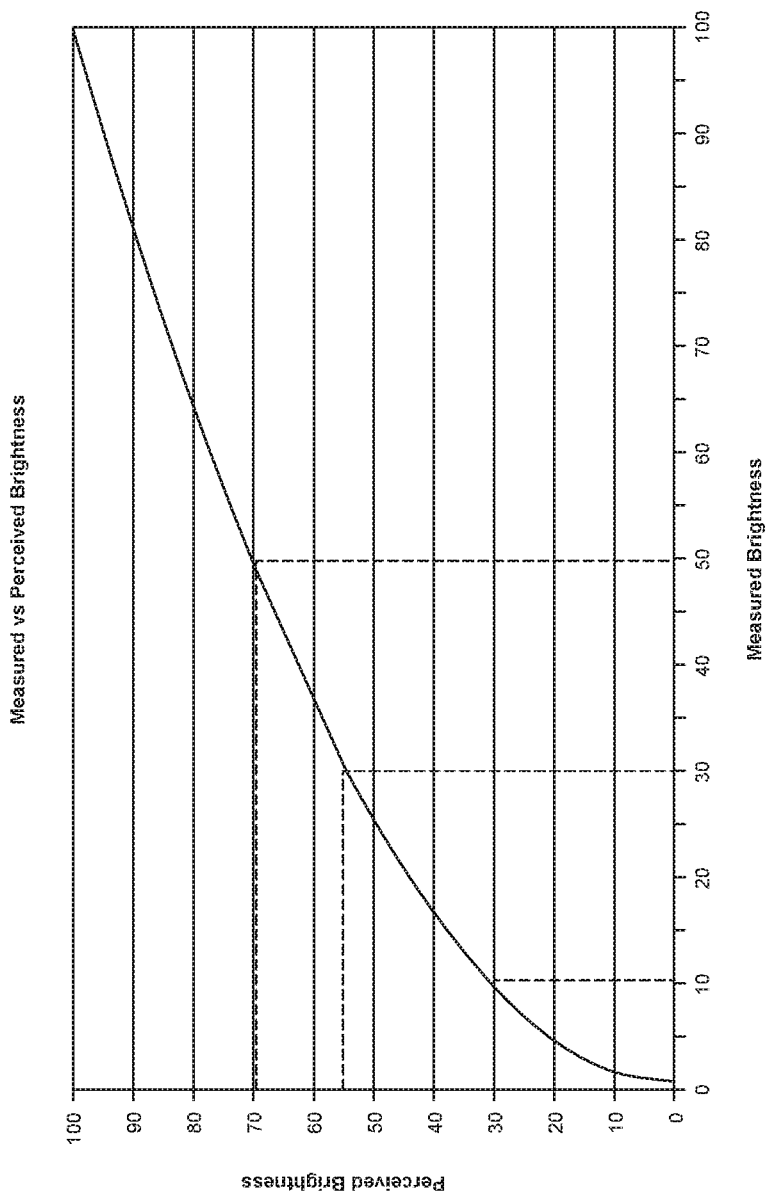
FIG. 3H is graph showing measured vs. perceived brightness, according to an aspect.

With reference now to FIG. 3H, a representative correlation between measured and perceived brightness is shown. The human eye does not respond linearly to light. If a luminaire utilizes a true linear dimming curve, the typical observer will see significant changes in brightness during the first 50% of the dimming range, e.g., as dimming is decreased from 100%, but fewer changes in brightness during the last 50% of the dimming range. The relationship between measured versus perceived brightness as shown in FIG. 3H, is approximately:

$$PerceivedLight(\%) = \sqrt{\frac{MeasuredLight(\%)}{100}} \quad \text{(Eq. 6)}$$

Figure 3I:
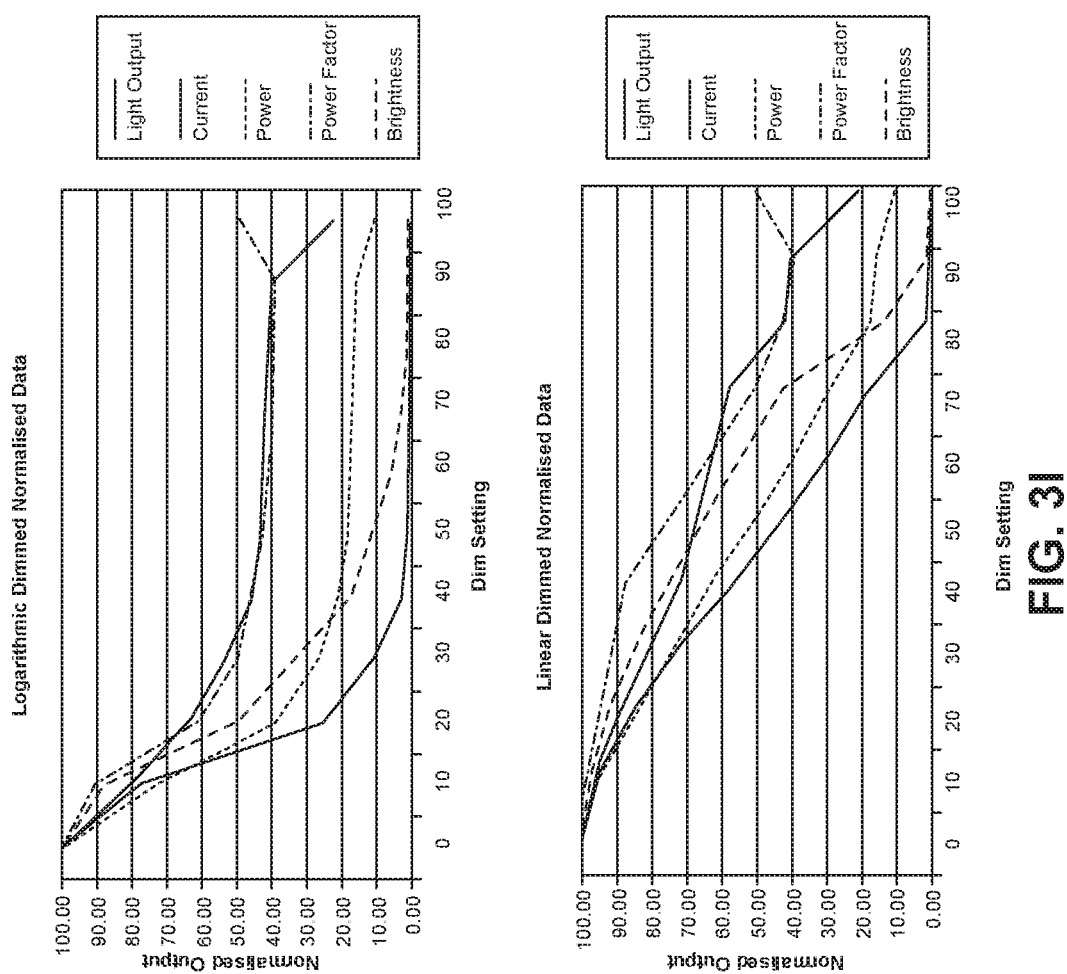
FIG. 3I is graph showing log vs. linear dimming test, according to an aspect.

With reference now to FIG. 3I, a test was conducted using an eldoLED-brand LED driver that can be programmed to output both logarithmic and linear dimming curves to view the differences between logarithmic and linear dimming as shown in FIG. 3I. Luminaire, power monitoring and control devices all remained the same between the two dimming protocols. All values were normalized for representation on a single plot, and perceived brightness was calculated and added to the plots. Analysis of the perceived brightness versus power consumption was conducted to ascertain the efficiencies of each of the dimming curves and a ratio was calculated as follows:

$$Light/PowerRatio = \frac{NormalisedPerceivedBrightness}{NormalisedPowerConsumption} \quad \text{(Eq. 7)}$$

Table 1, below, summarizes the results of the light/power analysis at various dimming levels for each of the logarithmic and linear dimming curves.

TABLE 1

| Dimming | Log Light/Power Ratio | Linear Light/Power Ratio |
|---|---|---|
| 0 | 1.000 | 1.000 |
| 10 | 1.210 | 1.025 |
| 20 | 1.292 | 1.105 |
| 30 | 1.268 | 1.162 |
| 40 | 0.820 | 1.198 |
| 50 | 0.623 | 1.306 |
| 60 | 0.324 | 1.382 |
| 70 | 0.162 | 1.460 |
| 80 | 0.094 | 0.762 |
| 90 | 0.096 | 0.099 |
| 100 | 0.000 | 0.000 |

Figure 3J:
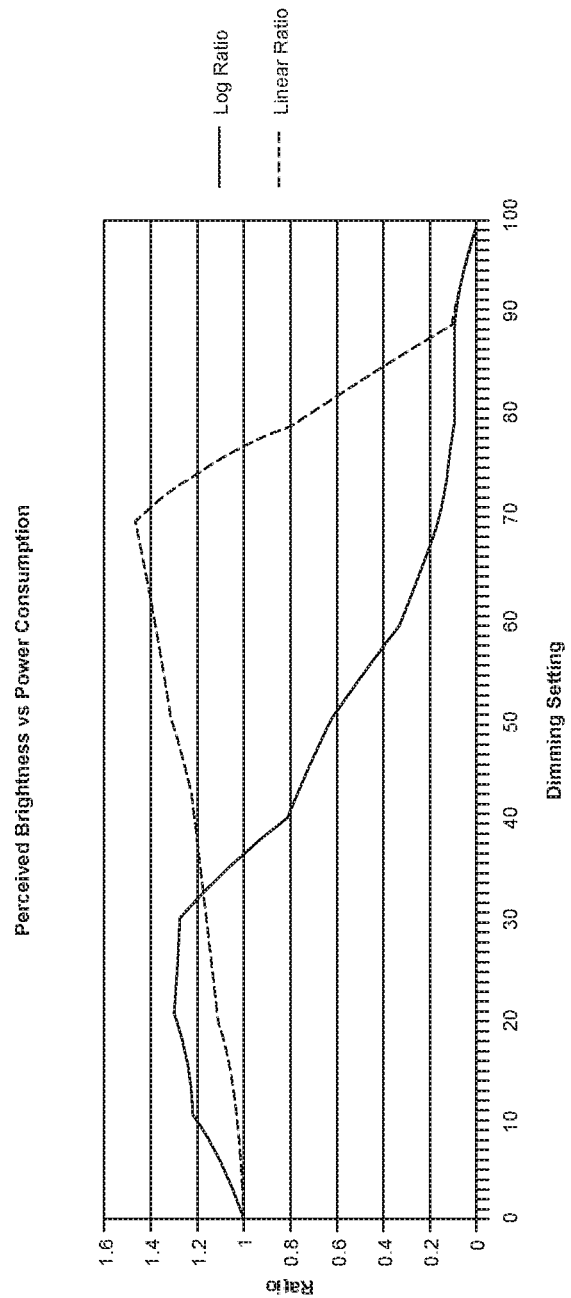
FIG. 3J is graph showing perceived brightness vs. power consumption, according to an aspect.

Further analysis of the two representative dimming curves as shown in FIG. 3J shows that a log dimming curve is slightly more efficient (more light per unit power) in the lower regions of dimming but a linear curve has more efficient performance in the higher dimming region for this particular driver. Nonetheless, each curve may be suited for particular applications. For example, hospitality and retail spaces may find the smooth high-end dimming of the logarithmic curve beneficial over the drop-off in light observed for the linear curve.

In typical commercial lighting installations, driver dimming/mapping will either be linear or logarithmic. Other types of dimming curves are typically found in particular applications such as entertainment lighting. Linear curves are typically more efficient while logarithmic curves allow for a smoother curve and feel to the dimming. In the disclosed exemplary embodiments, the power meter 114 and up looking color sensor may asses a luminaire/LED driver's dimming capabilities and modify the driver's dim settings using a software interface to achieve a desired light output, color temperature, efficiency, etc. correlated to other luminaires/LEDs in the lighting system. In an exemplary smart lighting installation, the dimming control signal will be a digital 0-100 value representing the dimming level or percent (e.g., with zero representing the minimum dimming level (maximum brightness) and 100 representing the maximum dimming level (minimum brightness)) and this will be consistent across all dimmers. Accordingly, the exemplary disclosed embodiments provide enhanced control over uncorrelated manual resistive-type dimmers that have manufacturing inconsistencies and digital dimmers with unique curves. The exemplary software interface is capable of characterizing light output, power, current, and power factor at all dim levels for all luminaires within a control group; this allows the dimming curve, dead band, and energy consumption of the luminaire to be identified. Using this data, the software interface can remove any dead band from the dimming range and set the measured brightness to follow a desired curve such as, for example and without limitation, linear perceived brightness, best fit for energy efficiency, etc. As the user then dims from 0-100, there will be a linear decrease in brightness.

The dimming range mapping can also take into consideration any global max dim values set for a product or group of products. For example, if an estate manager wanted to save 5% on energy across a lighting system, this may require more than a simple 5% change to each luminaire's dim settings because, as noted above, the same change in dimming percent across multiple luminaires may not result in equivalent changes to light output, power consumption, etc. due to the potential differences between each luminaire's dimming curve. In the case of disclosed curves in FIGS. 3I and 3J, a 5% dimming change for a logarithmic curve may result in approximately 14% energy savings, while the linear curve may realize only approximately 3% energy savings. As a further example, a simplified lighting system for a space may include two luminaires having different maximum brightness values and drivers having different dimming curves. Without correlating the light output and dimming curves of the two luminaires/drivers, the overall illumination in the space will not linearly follow corresponding changes to either or both luminaires because each luminaire is contributing to the overall illumination according to a particular maximum brightness and dimming curve. On the other hand, in the exemplary disclosed embodiments the dimming curves of luminaires 112/drivers across a lighting system are correlated such that, in part, the overall light output, perceived brightness, color temperature, power consumption, etc. of a group of luminaires 112 can be controlled across the group and in view of any changes to associated parameters of any individual luminaire 112.

Further, and as described further below, as the luminaire and/or driver ages, the dimming range mapping will likely require updating to account for the luminaire degradation and driver performance. The iterative dimming range mapping at various times throughout the life of the luminaire/driver may also provide data for predicting a half-life or end of life for the luminaire/driver, based on, e.g., the rate of degradation. Other factors such as the occurrence of dead band or dead travel may be used as additional metrics for predicting failure of the driver. The exemplary disclosed embodiments may be configured to use such information in adjusting the dimming level and/or dimming protocol of a luminaire/driver to maximize the life of the component.

Applying the previously mentioned software implementation to adjust the dimming characteristics of a driver can be applied to both a retrofit WIM and integrated core module situation. The software may be configured to handle the dimming curves for multiple LED lighting devices/drivers and thereby simplify the system design. Typically, one type of driver may be used with any number of combinations of luminaires from different manufacturers. The load of the luminaire on the driver will differ from product to product, which will in turn change the performance of the dimming of the system. The software implementation may adjust and compensate the dimming to the load attached to each driver. The software implementation may also calculate the most efficient dimming curve(s) to use with a particular luminaire/driver, as particular drivers may show different efficiencies depending on the dimming curve(s) that they are handling.

In the exemplary or other embodiments, manual control may be substituted for certain software-based implementations where consistent with this disclosure.

Figure 4:
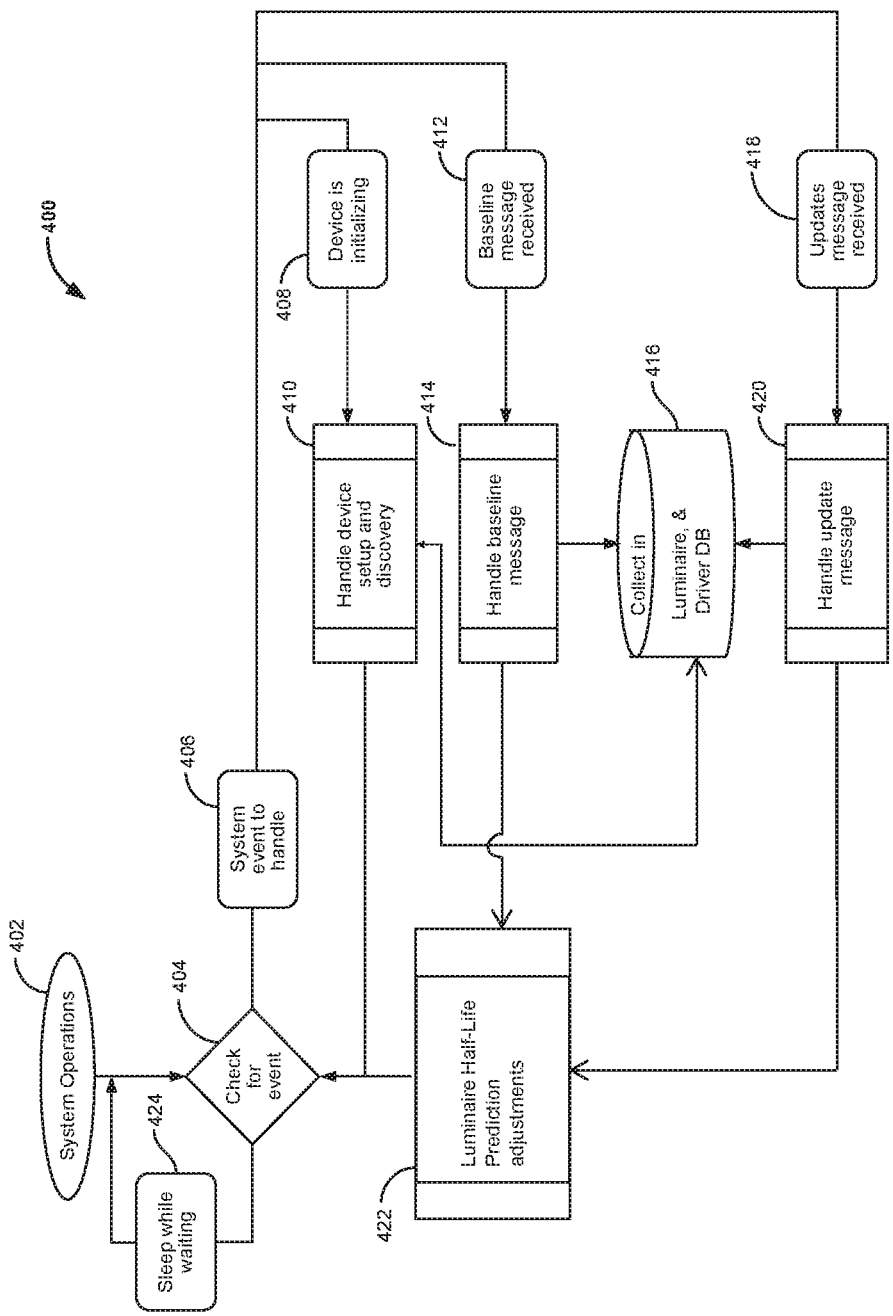
FIG. 4 depicts an embodiment of the system procedural global event handling.

FIG. 4 depicts an exemplary embodiment 400 in which the system operates at a high level. The cloud server 106 is in a reactive mode, waiting for events. Most of the time the cloud server 106 is in a sleep mode while waiting. The cloud server 106 wakes up regularly to check if an event exists 404. FIG. 4 depicts three different types of events 408, 412, and 418, which are pertinent to this disclosure. The first event 408 is "Device is initializing" which is handled by the "Handle device setup and discovery" 410. The details for these interactions are described in FIG. 5. The second type of event occurs when a "Baseline message received" 412. A Baseline Message may include, for example and without limitation, full sensor readings from sensor subsystem 108, power level readings from power meter 114, and current dimming state for the luminaire 112. The handling of 'Baseline Message' type of messages is described in FIG. 6 for the gateway 102. Finally, a third type of event is associated with 'Updates Message' handling 420 for the received "Updated messages" 418 (see FIG. 7). An Updates Message may include, for example and without limitation, changes or differentiations from a previous message set, where a message set can be a baseline message set or any of the updates message set. After handling incoming messages of any type, e.g., Baseline Messages or Updates Messages, the measurement updates or changes are recorded in the Luminaire and Driver Database (DB) 416. The handling of device setup and discovery is also recorded in the Luminaire and Driver DB 416 as depicted in FIG. 6.

After the handling of Baseline 412 and Updates 418 messages, the system will try to predict the luminaire half-life, or end of life, or adjust its predictions 422. At step 428, the system lets the color temperature handling control process know that an event occurred which may have changed the color temperature for a specific luminaire. Step 428 may entail adjusting the dimming level to adjust the color temperature and is described in further detail in FIG. 15. Changes in the dimming schedule of any luminaire will have impacts on its half-life expectancy; therefore, over time and based on usage, the predictions will change and become more accurate to the specific point-in-time of the measurements.

At step 402 system operations initiates. At step 404, system checks if there are events which need to be handled. If there are events which need to be handled by the system, operation goes to step 406. If there are no events which need to be handled by the system, the operation goes to step 424 in which the system enters sleep mode.

Figure 5:
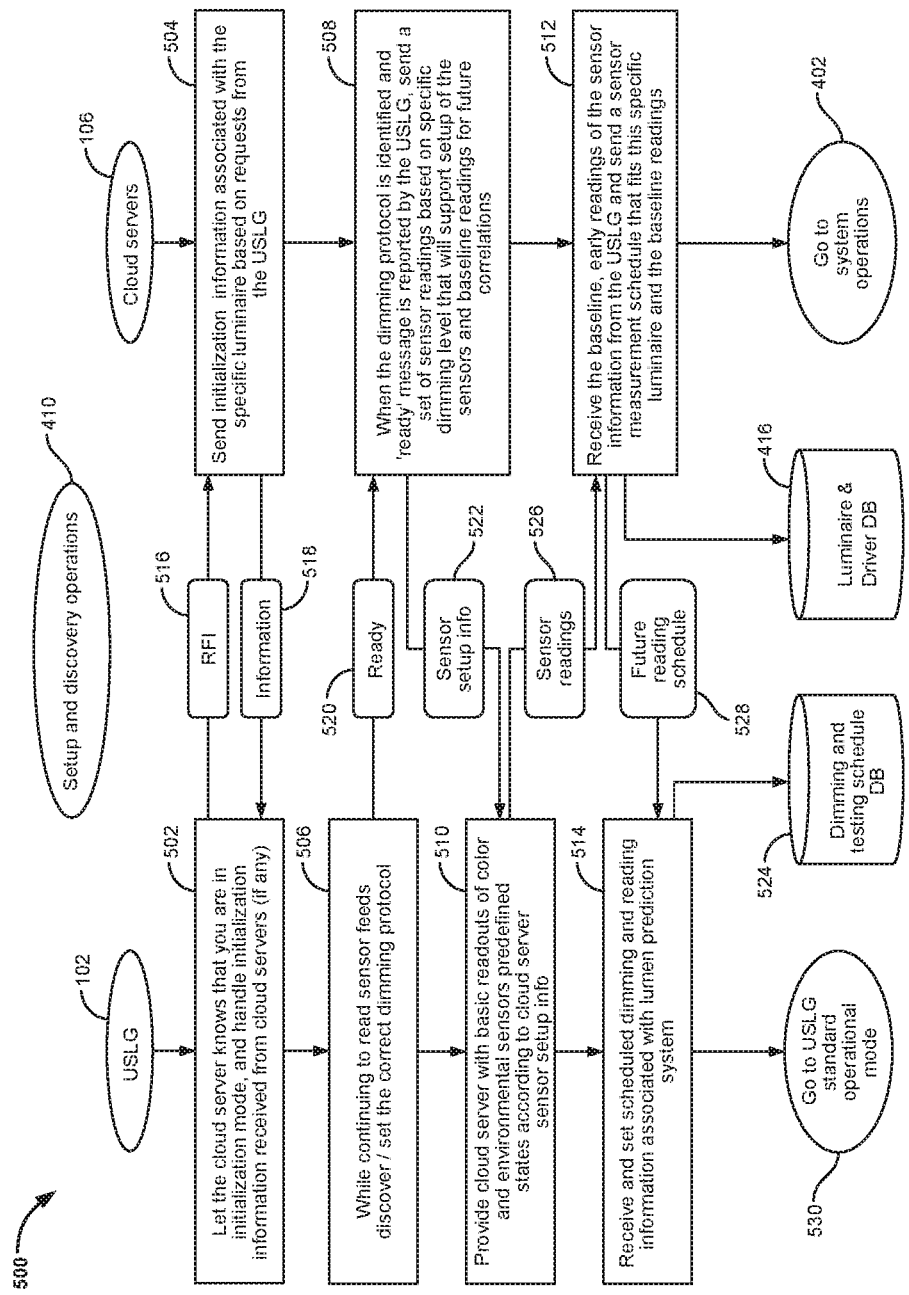
FIG. 5 depicts an embodiment of the system handling of device setup stage.
Figure 6:
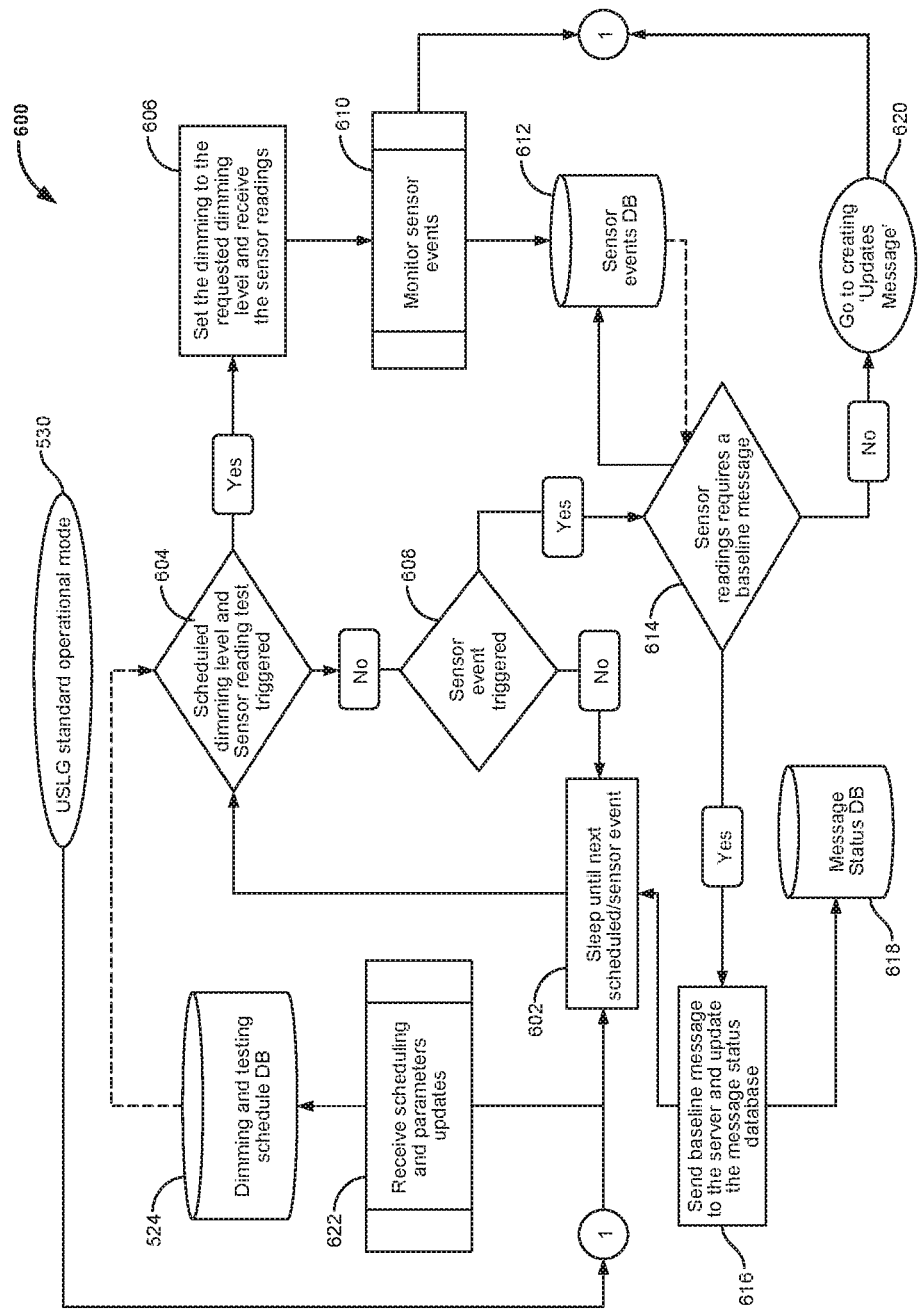
FIG. 6 depicts an embodiment of handling a gateway Standard Operational Mode.

FIG. 5 depicts an embodiment 500 of the system handling of device setup and discovery operations. The flow of information as it appears in the two separated parts of the system is as follows:

The first event after turning on a gateway 102 will be a request for information (RFI) 516 from the gateway 102 to the cloud server 106. This will be asking the cloud server 106 to provide minimal initialization information 518, or if it is already familiar with the controlled luminaire by this gateway 102, provide more information 518 based on this knowledge. The cloud server 106 will return an information (Information) message 518 to the gateway 102. The gateway 102 will set the appropriate dimming protocol for the luminaire and send a ready (Ready) message 520 to the cloud server. The Ready message 520 includes identifying the luminaire, its dimming protocol, and sensor information as collected during the dimming protocol test/discovery 506 by the gateway 102. At step 508, after receiving the Ready messages 520, the cloud servers 106 may respond with the 'Sensor Setup info' 522 including, e.g., dimming and sensor information associated with the setup of the sensors for baseline and for tune-up. The gateway 102 will set the luminaire to the pre-defined states and collect the readings of the sensors 510. The information collected is sent to the cloud server as part of 'Sensor Readings' message 526. The cloud servers 106 then send back final tune-up information and a schedule for dimming and measurements that need to be done on a regular basis (Sensor Future Reading Schedule) 528. The cloud server will update the Luminaire and Driver DB 416 and continue to System Operations 402. The gateway 102 is recording the scheduling information in the Dimming & Testing Schedule Database 524 and continues to a Standard Operational Mode 530.

In another aspect, the gateway 102 and sensor subsystem 108 can be controlled such that measurements are taken, for example and without limitation, only when environment measurements are in a certain range, as well as when the dimming level is in a certain range. Therefore, the dimming parameters, the environmental reading parameters, and the sensor parameters and reading setup can all be controlled from outside of the gateway 102 via cloud servers 106 which are connected to the gateway 102 and/or sensor subsystem 108.

FIG. 6 illustrates an embodiment 600 of the handling of the gateway Standard Operational Mode 530. In an embodiment, the gateway 102 may spend most of its time in a sleep mode 602 while waiting for a scheduled dimming control or sensor reading to occur according the dimming and sensor reading schedule (from Dimming & Testing Schedule DB 524). If the scheduled action is a Schedule Test Triggered 604, for example, the gateway 102 may, at a specific time, set a specific dimming level, and wait for the set of sensor readings 606. If the scheduled action is "Sensor Event Triggered 608", the gateway 102 may conduct/set sensor readings for, for example, the RGB sensor readings and/or environment sensor readings, which may be present and need to be read and processed. According to an aspect of the exemplary embodiment, monitoring of the sensor events at 610 occurs in parallel (i.e., in the background) while the gateway 102 is in sleep mode.

In an exemplary embodiment, the gateway 102 does not process or handle tasks that are not scheduled. The gateway 102 will only process scheduled tasks and will remain in sleep mode 602 unless a scheduled dimming or sensor action exists. The scheduled tasks can be, for example and without limitation, setting a new dimming level 606 and waiting for sensor events (e.g., 412, 418) 610 and/or taking one or more sensor readings 608. According to an aspect, after the initialization 408 of the gateway 102, the gateway 102 receives a scheduling message 514 from the cloud servers 106. At step 604, for instance, the gateway 102 may set parameters to populate the Dimming and Testing Schedule DB 524. According to an aspect, the Receive scheduling and parameters updates 622 process will update the Dimming and Testing Schedule DB 524 and may also refresh a sleep timer for the gateway 102 based on the dimming and testing schedule. When a scheduled test is triggered 604, the gateway 102 sets the dimming to the requested light percentage/lumen intensity 606, and at the monitoring sensor event step 610, the sensor events database 612 is updated and the gateway 102 enters sleep mode 602 until the next scheduled dimming control or sensor reading action.

According to an aspect of an exemplary embodiment, a scheduled dimming control and/or sensor reading action includes at least one sensor reading that is completed by the system 100. The system 100 may send sensor measurement requests to the sensors directly or via the gateway 102. The requests can be, for example, to perform an action only when the temperature readings reach a specific level/range, the AMP reading reaches a specific range, and read color intensity of the light source multiple times.

Figure 7:
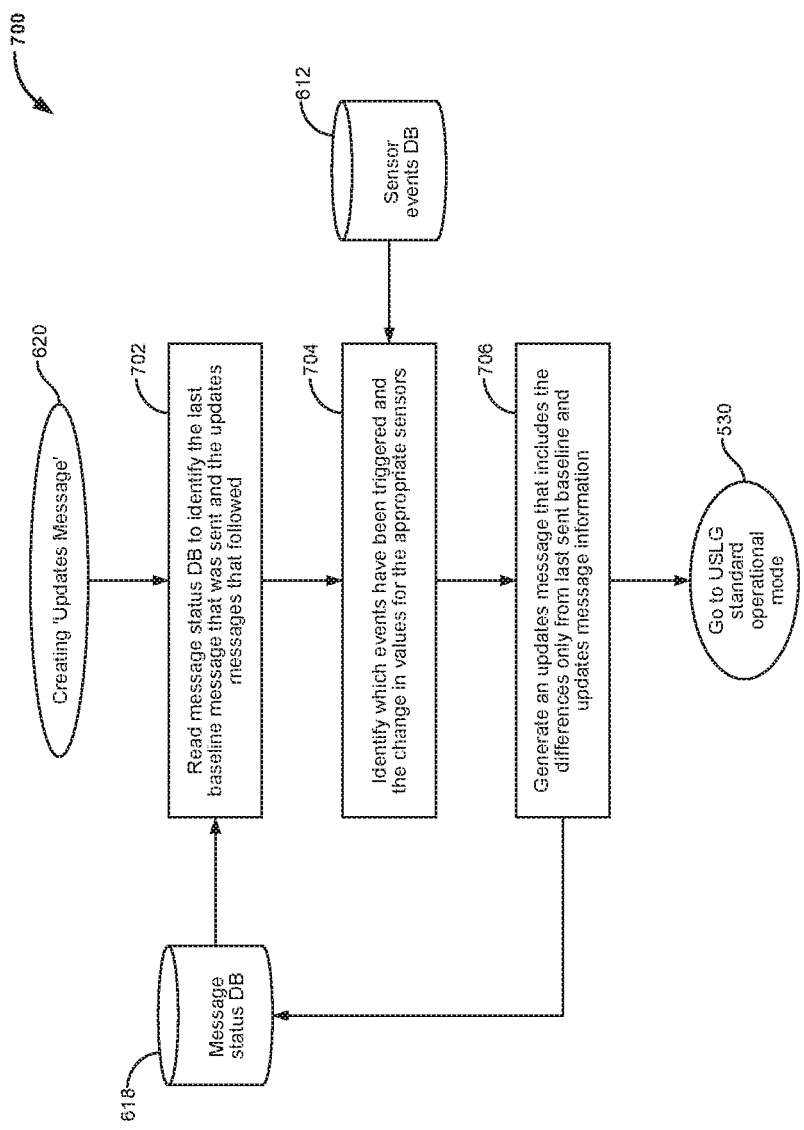
FIG. 7 depicts an embodiment of creating 'Updates Message'.

With further reference to FIG. 4, when a sensor event occurs there can be multiple outcomes. In an embodiment, if the sensor reading is the last sensor reading required for a specific associated dimming level, the gateway 102 will decide whether the resulting measurements justify a new baseline message 614 or an updates message (FIG. 7). The gateway 102 may generate a new baseline message and send it to the cloud server (106) 616 if, for example, no baseline reading exists or the current baseline sensor readings are different from previous, corresponding baseline sensor readings by a set threshold. The gateway 102 may decide to generate and forward to the cloud server 106 an updates message if, for example, the current sensor readings indicate that aspects of the color content or intensity, associated color temperature, and/or environment have changed since the last sensor readings, as described further below with respect to FIG. 7. The gateway 102 may also update the dimming control and sensor reading schedule 616 in the Dimming & Testing Schedule DB 524 to set the next dimming control or sensor reading action before entering sleep mode 602. In an exemplary embodiment, the gateway 102 will enter sleep mode whenever it is waiting for a dimming control or sensor reading action, or other associated, scheduled task.

According to an aspect, before the gateway 102 enters sleep mode the current sensor readings and associated information, such as the time of the reading, are recorded in the Sensor Events DB 612 for future processing or reference. Further, in the exemplary embodiment shown in FIG. 6, the gateway 102 updates a Message Status DB 618 with information regarding any baseline or updates messages that were (or were not) generated and or sent to the cloud servers 106, including, for example, the differences between the current baseline sensor readings and previous baseline sensor readings compared to the threshold for a new baseline message. On the other hand, when a new baseline message is not required, the gateway 102 goes to step 620 for the updates message process described with respect to FIG. 7.

FIG. 7 illustrates an exemplary embodiment of a process 700 for Creating an 'Updates Message' 620. According to an aspect, the Creating an Updates Message 620 depends on the accumulation of all prior updates messages recorded in the Message Status Database 618. The gateway 102 can read the Message Status DB 618 to identify past baseline and updates messages 702 and read the Sensor Events Database 612 to identify previous sensor readings. The gateway 102 is further configured to receive the current dimming level of the luminaire 112 and current sensor readings from the sensor subsystem 108. Thus, the gateway 102 can identify sensor readings that have changed 704 from previous sensor readings and generate an updates message 706 to include those readings only and send this message to the cloud server 106. Once the updates message is sent, the Message Status DB 618 is updated for future analysis and the gateway 102 may enter sleep mode and wait for the next scheduled dimming control or sensor reading action in the Standard Operational Mode 530.

At step 702, the gateway 102 after receiving messages from Message Status DB 618 identifies the last baseline message that had been sent and the Updates messages that followed. At step 704, after receiving information from the Sensor Events DB 612, gateway 102 identifies which of the events have been triggered and what changes have taken place in the values for the appropriate sensors. At step 706, the gateway 102 generates an Updates message, which includes the differences only between last sent baseline message and the accumulated updates message information and the current sensor readings 612. At step 530, the gateway 102 moves into standard operational mode 530. At the same time, at step 706, the gateway 102 updates the Message Status DB 618.

Figure 8:
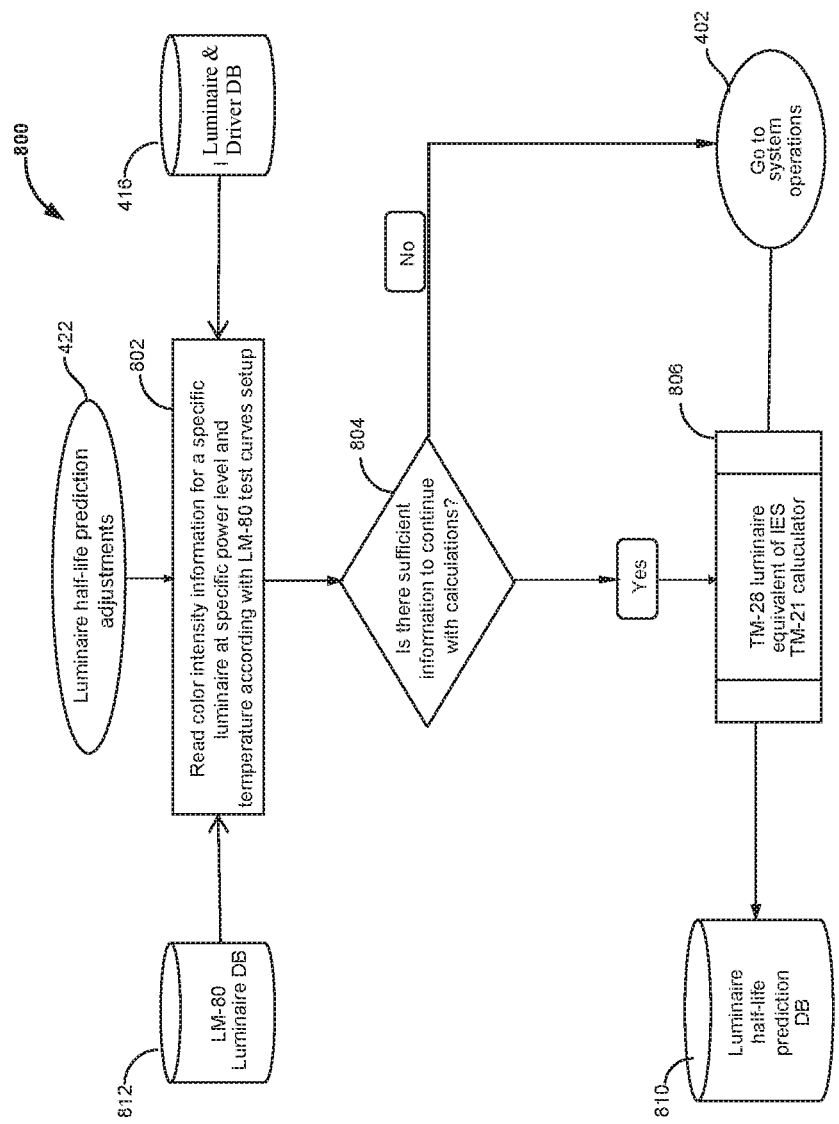
FIG. 8 depicts an embodiment of the cloud servers calculating specific luminaire half-life prediction information.
Figure 8A:
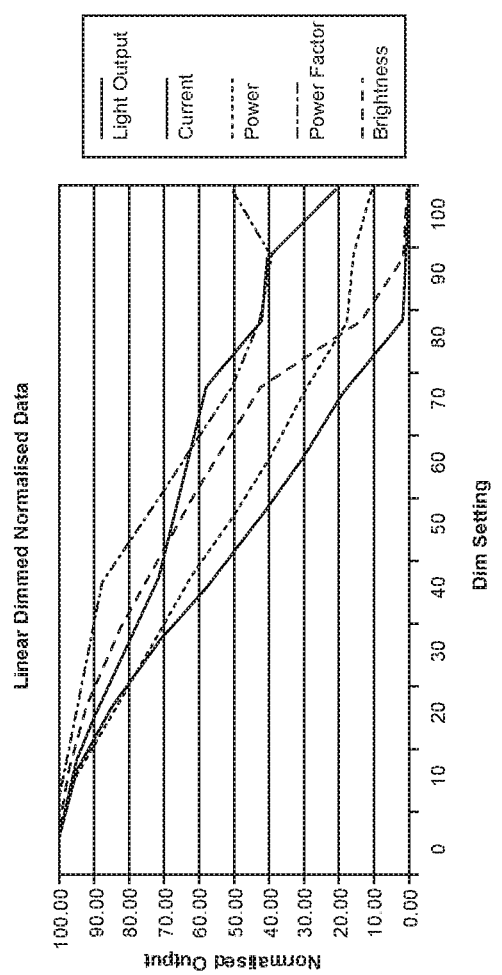
FIG. 8A depicts an exemplary light degradation graph.

FIG. 8 depicts an exemplary embodiment 800 of cloud servers calculating specific luminaire half-life prediction information, as follows. In order to calculate luminaire degradation, color sensors provide color intensity and/or luminosity readings/measurements that are linearly correlated to a luminaire light intensity depreciation graph (FIG. 8A). The linear correlations are normalized over time in this embodiment and the color sensors are consistent in their readings across a plurality of sensors such that when an LED light intensity reading is changing by X %, the sensor color intensity reading changes by the same X %. The sensor 'total intensity readings' may not be equivalent to the actual lumen emission by the luminaire device that the sensors are attached to due to any number of factors such as distance or orientation of the sensor to the light source, interference, etc. The disclosed systems and methods allow the color intensity of each luminaire to be accurately correlated at any given time, regardless of the type of luminaire, because the data is dynamic and normalized. The normalized, linear correlations also provide compensation for differences between different types of dimming controllers (drivers) and inherent variations in tolerances of the same dimming controllers.

When exponential graphs are linearly correlated, a change in one (the curve) can fit the curve (change) in the other directly. Illuminating Engineering Society of North America (IESNA) Standard LM-80 ("Approved Method for Measuring Lumen Maintenance of LED Light Sources") includes manufacturing data for a plurality of LED light sources, which when paired with a luminaire's chip running temperature can provide theoretical predictive life calculations. By testing the luminaire to IESNA LM-79 ("Approved method for the Electrical and Photometric Measurements of Solid-State Lighting Products") standards and utilizing any IESNA Standard LM-82 ("Characterization of LED Light Engines and LED Lamps for Electrical and Photometric Properties as a Function of Temperature") data that may be available, a Luminaire and Driver DB 416 may be generated. The Luminaire and Driver DB 416 includes information that is specific to the fitting and dimming, as well as to the sensor reading ranges, etc., associated with the specific luminaire. The Luminaire and Driver DB 416 also includes information such as past sensor readings, associated times of reading, dimming level, temperatures, current readings, etc. Sensor readings such as color intensity can be normalized based on the original (initial) readings received upon installation and/or commissioning of the luminaire in the lighting system as in FIG. 5.

In one embodiment, an Energy Star® TM-28 calculator, which is the equivalent of an Illuminating Engineering Society (IES) TM-21 ("Lumen degradation lifetime estimation method for LED light sources") calculator 806, is taking data that was collected over time in the Luminaire and Driver DB 416 for test samples and is plotting this information after normalization into TM-28. This step allows for prediction of luminaire maintenance over time. The standard information within LM-80 given by the manufacturer is insufficient and is dependent on a fixed temperature and the current state of the luminaire for the readings. In one embodiment, the disclosed system is using the sensor readings at specific environment temperatures and luminaire dimming levels to extrapolate the place of the luminaire color intensity readings on the LM-80 given curves of this specific luminaire. Using this information, and knowing the time period elapsed between readings, and after correlating this information with previous readings, the system can extrapolate a new curve that more accurately represents the current luminaire's behavior. As such, the relationship or correlation between color temperature and dimming level can be determined, and this relationship can be updated over time as the color temperature (lumen level) of the luminaire degrades over time. This new curve is based on the luminaire's true environment and usage (e.g., dimming schedule, power and temperature levels, degradation of the lens and the physical fittings, etc.) over time. This information is stored in the Luminaire Half-life Prediction Database 810 for future use, and the next step is to wait for the next event as part of the System Operations 402 (FIG. 4).

The multiple sensor readings associated with color intensity are normalized using an equation that divides the current reading by the initial reading taken when the luminaire was first installed and/or commissioned in the lighting system as in FIG. 5.

At step 802, after receiving information from LM-80 Luminaire DB 812 and Luminaire and Driver DB 416, the cloud server 106 reads the color intensity information for a specific luminaire at a specific power level and temperature. The Luminaire and Driver DB 416 includes information that is specific to the fitting and dimming, as well as to the sensor reading expected ranges, etc., associated with the specific luminaire. The Luminaire and Driver DB 416 also includes all past sensor readings, with associated times of reading, dimming levels, temperatures and current readings. All of this was accumulated, as depicted in previous FIGS. 4, 5, 6, and 7. The multiple sensor readings can be normalized by dividing the present reading by the initial reading received upon installation and/or commissioning of the luminaire in the lighting system as in FIG. 5.

At step 804, the cloud server 106 decides if the collected accumulated information is sufficient to continue with calculations. If the response is 'Yes', then the operation moves to step 806. If the response is 'No', then the operation moves to step 402, which is the system operation's main loop.

At step 806, the TM-28 luminaire equivalent of IES TM-21 calculator takes data that was collected over time in the Luminaire and Driver DB 416 for a test sample and plots this information after normalization into TM-28 which is the luminaire equivalent of IES TM-21 calculator 806. This step allows for prediction of lumen maintenance over time.

At step 810 the information generated in 806 is stored in the Luminaire Half-life Prediction Database 810 for future use.

FIG. 9 depicts an embodiment 900 of the sensors interface data structures. The sensor interfaces include the Sensor Global Configuration Registers Interface 902, the Environment Sensor Configuration Registers Interface 904, and the Color Sensor Configuration Registers Interface 906. In one embodiment these data structures are memory mapped registers. To send information via a memory mapped register the application writes to the memory address that was allocated for this register. To receive information, the application reads the memory address that was allocated for the specific register. In FIG. 9 the relative address of the register is marked in boxed brackets. The size of every address is exactly one byte (eight bits) in the exemplary embodiment shown in FIG. 9.

The Sensor Global Configuration Registers Interface 902 includes a plurality of global configuration registers responsible for performing a plurality of activities. Available Sensors—[0x01] 908 shows which sensors are available for the particular device. The Available Sensors—[0x01] 908 may show at least a Temperature Sensor (TEMP), an Ambient Light Sensor (ALS), a color sensor (RGB), a Motion detector sensor based on Passive Infrared (PIR), a Motion detector and direction sensor based on frame capture, and so on. Sensors Alarm—[0x02] 910 shows which sensors have generated an interrupt. Sensors Alarm Interrupts—[0x03] 912 enables/disables interrupt from each available sensor whenever an alarm is generated. Power Management—[0x04] 914 controls power up/power down functions for the different sensors. Configure Management—[0x05] 916 stores register values in non-volatile memory. Hardware Register Access Address (HRAA)—[0x06] 918 holds the address for accessing the internal hardware registers of sensors. Hardware Register Access Data (HRAD)—[0x07] 920 holds the data to load/store in the address given in the register HRAA—[0x06] 918. Direct Hardware Register Access RW—[0x08] 922, if it holds a value "1", then the data in the register HRAD—[0x07] 920 is written to the address in register HRAA—[0x06] 918. If Direct Hardware Register Access RW—[0x08] 922 holds a value "0", then the data pointed to by register HRAA—[0x06] 918 can be read in register HRAD—[0x07] 920.

The Environment Sensor Configuration Registers Interface 904 includes a plurality of environment specific sensor registers. Ambient Light Sensor (ALS) Range—[0x20] 924, if it holds a value "1", enables a high measurement range of 1000-10,000 Lux for the ALS. If ALS Range—[0x20] 924 holds a value "0", then a low measurement range of 1-1,500 Lux gets enabled. ALS Measurement Interval—[0x21] 926 displays the elapsed time between subsequent ALS measurements. ALS Lower Threshold MSB—[0x22] 928 displays Most Significant Byte (MSB) for ALS lower threshold for triggering an alarm. ALS Lower Threshold Least Significant Byte (LSB)—[0x23] 930 displays LSB for ALS lower threshold for triggering an alarm. ALS Higher Threshold MSB—[0x24] 932 displays MSB for ALS higher threshold for triggering an alarm. ALS Higher Threshold LSB—[0x25] 934 displays LSB for ALS higher threshold to trigger an alarm. ALS Result MSB—[0x2A] 936 displays MSB for ALS measurement results. ALS Result LSB—[0x2B] 938 displays LSB for ALS measurement results. TEMP Threshold—[0x90] 940 displays upper threshold value for when an interrupt is triggered. TEMP Measurement Interval—[0x91] 942 displays a temperature measurement interval in seconds. TEMP Data—[0x92] 944 displays temperature values in degrees Celsius.

The Color Sensor Configuration Registers Interface 906 includes a plurality of color specific sensors. In one embodiment, the colors are Red, Green and Blue (RGB). RGB Conf. —[0x50] 946 controls both calibration configuration and reports when a sensor reading is available. RGB Red Cal.—[0x51] 948 displays calibration constant for red value from RGB sensor. RGB Green Cal.—[0x52] 950 displays calibration constant for green value from RGB sensor. RGB Blue Cal.—[0x53] 952 displays calibration constant for blue value from RGB sensor. Red Value MSB—[0x54] 954 displays MSB result of Red value from RGB sensor. Red Value LSB—[0x55] 956 displays LSB result of Red value from RGB sensor. Green Value MSB—[0x56] 958 displays MSB result of Green value from RGB sensor. Green Value LSB—[0x57] 960 displays LSB result of Green value from RGB sensor. Blue Value MSB—[0x58] 962 displays MSB result of Blue value from RGB sensor. Blue Value LSB—[0x59] 964 displays LSB result of Blue value from RGB sensor. Any of a plurality of colors can be used for color intensity measurements. The sensor chosen depends on the LED/luminaire color utilization. Luminaire devices may have design based or physics based preferences to emit specific colors; the color sensor used in every specific case should be based on those preferred colors. The RGB given in this example is based on one embodiment; other embodiments may use other colors.

Figure 10:
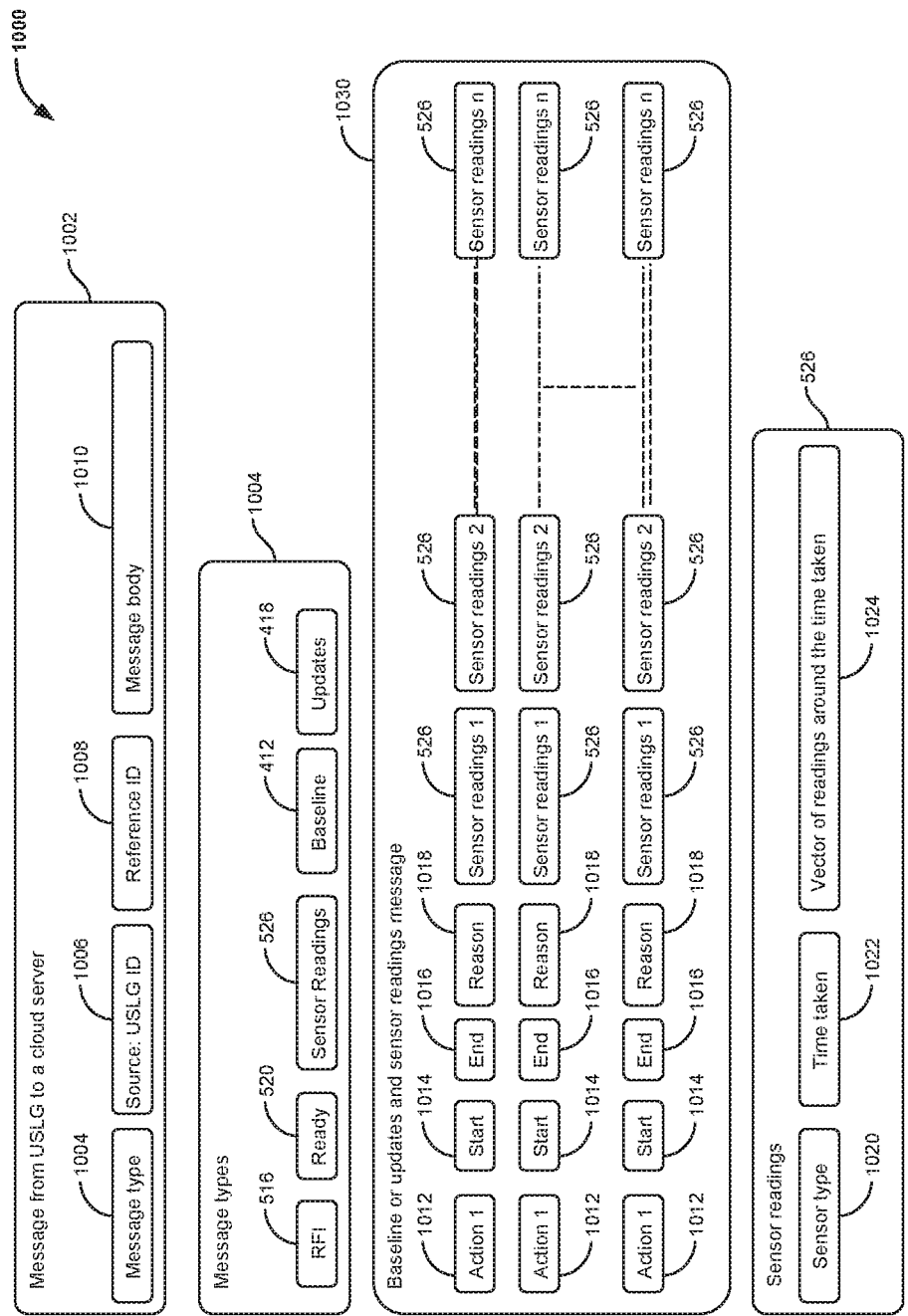
FIG. 10 depicts an embodiment of message structure for messages delivered from the gateway to the cloud servers.

FIG. 10 depicts an embodiment 1000 of message structure for messages delivered from the gateway 102 to the cloud servers 106. In one embodiment the message 1002 going to the cloud server 106 is of a single structure. This structure includes Message type 1004, the sender gateway unique identification (Source: gateway ID) 1006, a unique Reference ID 1008 and the Message body 1010. The Message type 1004 informs the receiver about the type of the message. The reference ID 1008 is an internal number used when there is a conversation between the cloud servers 106 and the gateway 102. The message body 1010 can be a baseline message or an updates message and it is structured the same in both cases.

In one embodiment 'Message types' 1004 can be a 'Request for Information' (RFI) 516, which is sent upon initialization of the luminaire. A 'Ready' message 520 is sent during initializations of the luminaire after discovering the dimming protocol and when the gateway 102 is ready for further instructions. Sensor readings message 526 is sent to the cloud servers 106 during the initialization period. The 'Baseline' 412 and the 'Updates' 418 message types are used when sending baseline or updates messages that are based on cloud servers 106 prior scheduled sensor readings taken and/or transmitted by the specific gateway 102.

In one embodiment the 'Baseline or Updates and Sensor Readings Message' 1030 is a 'Message body', which is sent for the baseline 412, updates 418 and sensor readings 526 message types. The message stature is the same. For every 'action' 1012, which can be a dimming level set, there is 'Start' 1014 which is the actual start time, 'End' 1016 which is the time the action was terminated, 'Reason' 1018 which is why the action terminated, and sensor readings for all sensors participating in this action as they were scheduled by the cloud server. The 'Reason' 1018 can be, e.g., failure to obtain an accurate feedback dimming level.

The Sensor reading 526 part of the message includes a 'Sensor type' 1020 field to indicate which sensor reading this is (TEMP, ALS, RGB, etc.), a 'Time taken' 1022 field to indicate when it was taken, and a 'Vector of readings around the time taken' 1024 which includes multiple readings centered around the 'Time taken' 1022 field. In one embodiment, the number of readings can be based on the sensor type. In another embodiment the number of readings is three, including shortly before, at, and shortly after the 'Time taken' 1022 field value.

Figure 11:
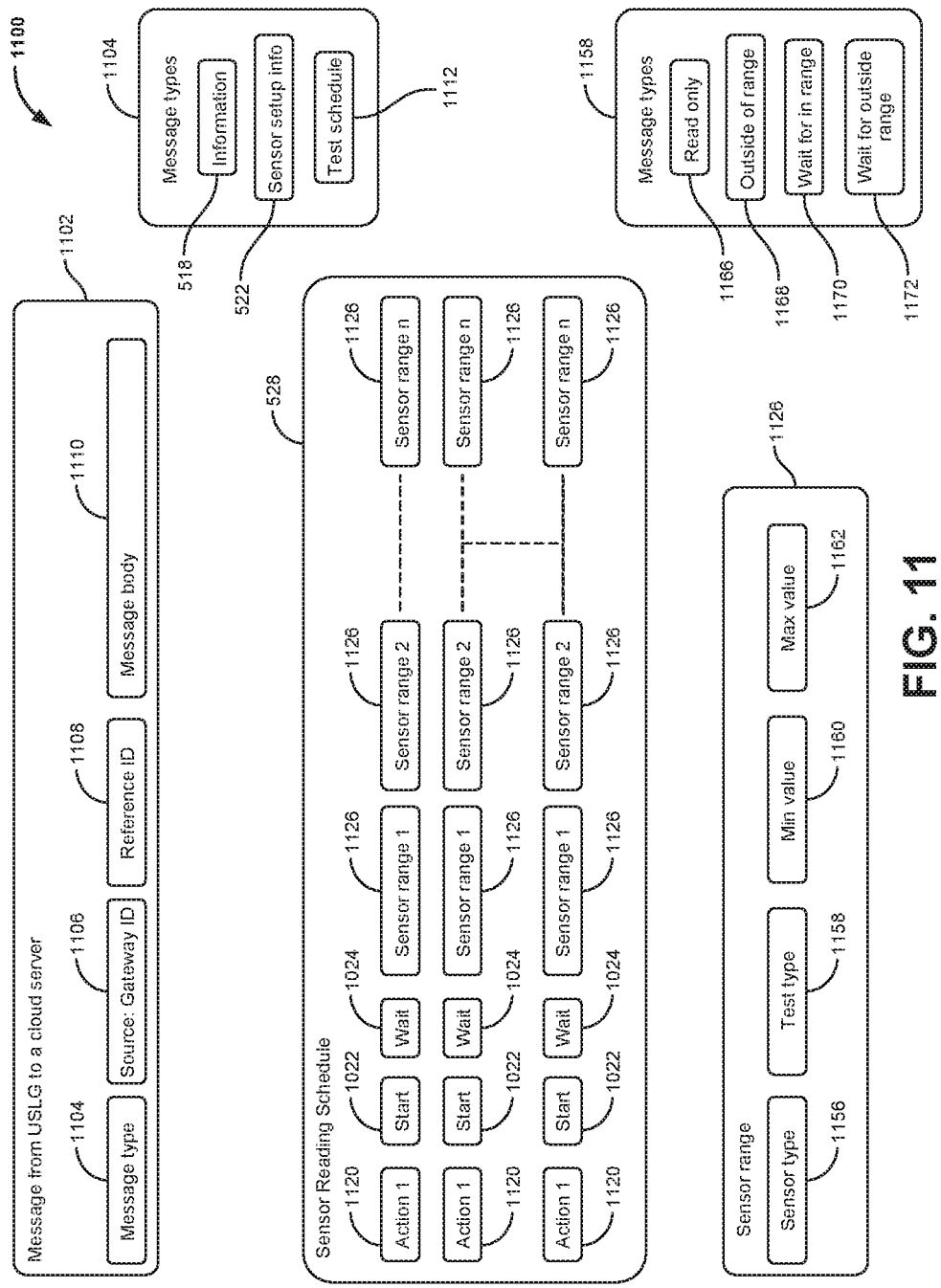
FIG. 11 depicts an embodiment of message structure for message delivered from the cloud servers to the gateway.

FIG. 11 depicts an embodiment 1100 of message structure for message delivered from the cloud servers 106 to the gateway 102, as follows. In one embodiment the structure of the message 1102 is constant. This structure includes Message type 1104, a target gateway unique identification 1106, a unique Reference ID 1108 and the Message body 1110. The Message type 1104 lets the receiver know what kind of message it is. The reference ID 1108 is an internal number used when there is a conversation between the cloud servers 106 and the gateway 102. The Message body 1110 is a Sensor Future Reading Schedule 528 (see FIG. 5) in the disclosed embodiment.

In one embodiment the Message types 1104 are 'Information' 518, 'Sensor Setup Info' 522 and 'Test Schedule' 1112. The 'Information' 518, such as the 'Sensor Setup Info' 522 messages provides the gateway 102 with information about valid ranges for sensor readings at different dimming levels. The Message body 1110 is a Sensor Future Reading Schedule 528 that is a baseline for the gateway 102 in its internal measurement and initialization cycle. The gateway 102 will have a default setup, yet this message can update this default.

In one embodiment the Sensor Future Reading Schedule 528 includes an 'Action' 1120 field, which is the dimming level, the 'Start' 1122 field, which is the start time for the test, the 'Wait' 1124 field which is the duration to wait before any measurement commences, followed by a list of sensors that participate in the measurements 1126. The list of sensors is given as a list of Sensor ranges per sensor 1126.

In one embodiment, the Sensor range 1126 includes 'Sensor Type' 1156 field, which identifies the sensor, 'Test Type' 1158 field, which informs the gateway 102 how to run the test, and 'Min Value' 1160 and 'Max Value' 1162 fields, which provide the valid range for the sensor in this test. In one embodiment the 'Test Type' 1158 directs the gateway 102 in ways to handle different sensor values. When Test Type 1158 is 'Read Only' 1166 the value of the sensor is retrieved regardless of range. When Test Type 1158 is 'Outside of Range' 1168 the value of the sensor must be outside of the range to be retrieved. When Test Type 1158 is 'Wait for in range' 1170 the gateway 102 does not continue with other readings until the specific sensor is in given range. When Test Type 1158 is 'Wait for outside range' 1172 the gateway 102 will not continue to read sensor values until this sensor value is outside the given range.

Figure 12:
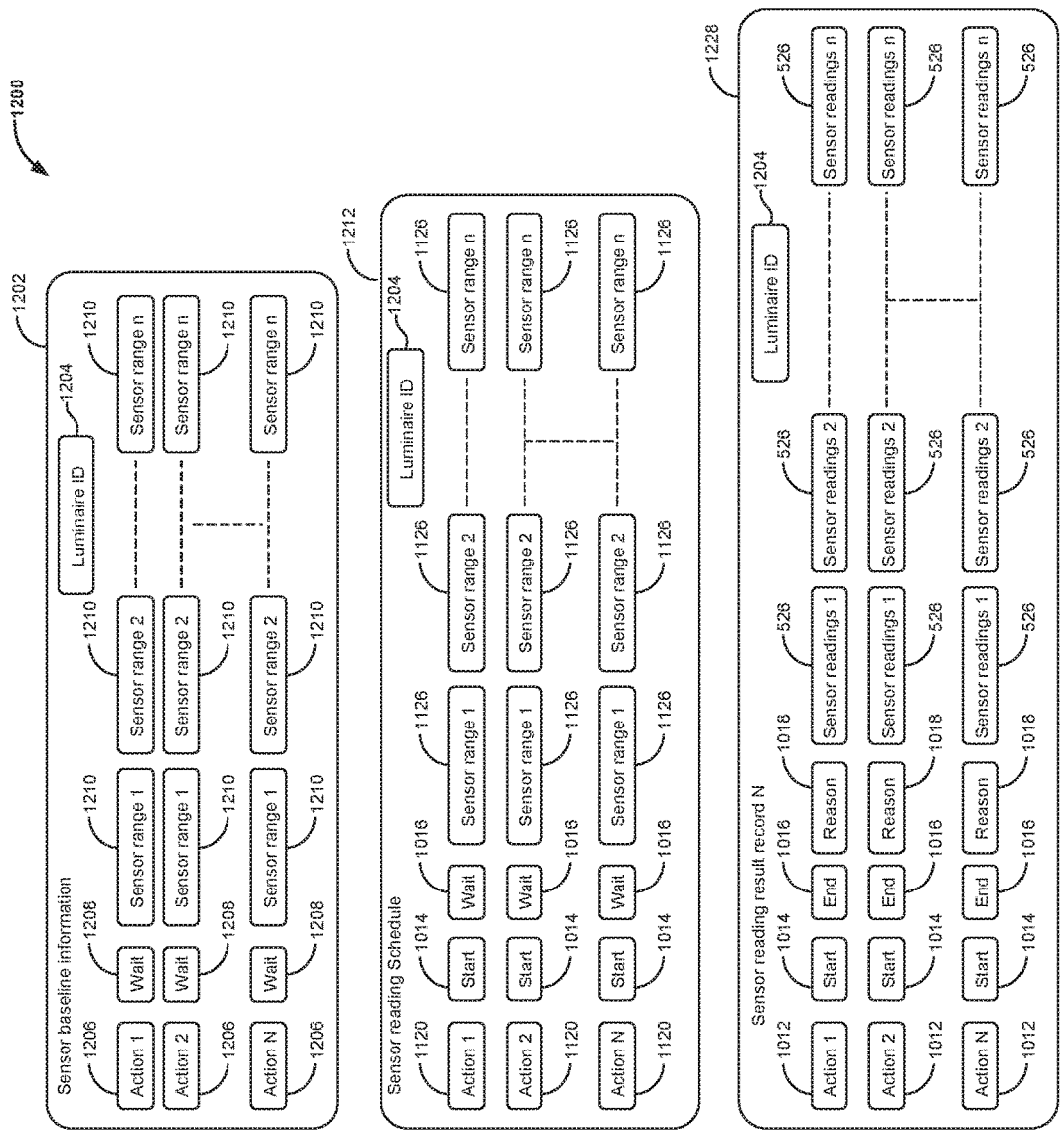
FIG. 12 depicts an embodiment of the Luminaire Database structure.

FIG. 12 depicts an embodiment 1200 of the Luminaire and Driver DB 416 structure. In one embodiment the Luminaire and Driver DB 416 includes three types of records for every connected luminaire in the system. The records are: Sensor Baseline Information 1202, Sensor Reading Schedule 1212 and Sensor Reading Result Record 1228. There is single Sensor Baseline Information 1202 and Sensor Reading Schedule 1212 record per luminaire. The Sensor Reading Result Record 1228 is numbered between 1 and N. This type of record is being added for every reading result and is being kept for as long as needed, e.g., N can be very large.

In one embodiment the Sensor Baseline Information 1202 includes sensor range information for all possible dimming levels that might be tested for this specific luminaire. Each dimming action field 1206 includes the minimal Wait time 1208, which the gateway 102 must wait before taking sensor measurements, and a list of Sensor range fields 1210, one per sensor that needs to be monitored. The Luminaire ID 1204 field is for identifying the luminaire that this record belongs to.

In one embodiment the Sensor Reading Schedule 1212 record is identical to the Sensor Future Reading Schedule 528 as described in FIG. 11, except for one additional field—the Luminaire ID 1204 field that is used to identify the luminaire to which the record corresponds.

In one embodiment the Sensor Reading Result Record 1228 is an accumulation of the Sensor Reading Message 1030 as described in FIG. 10, except for one additional field—the Luminaire ID 1204 field which is used to identify the luminaire that this record belongs to. In fact, every time the cloud server 106 receive a Sensor Reading Message 1030 that might be a Baseline message or an Updates message, the cloud server 106 will store this message as a Sensor Reading Result Record 1228 for the specific luminaire.

Figure 13:
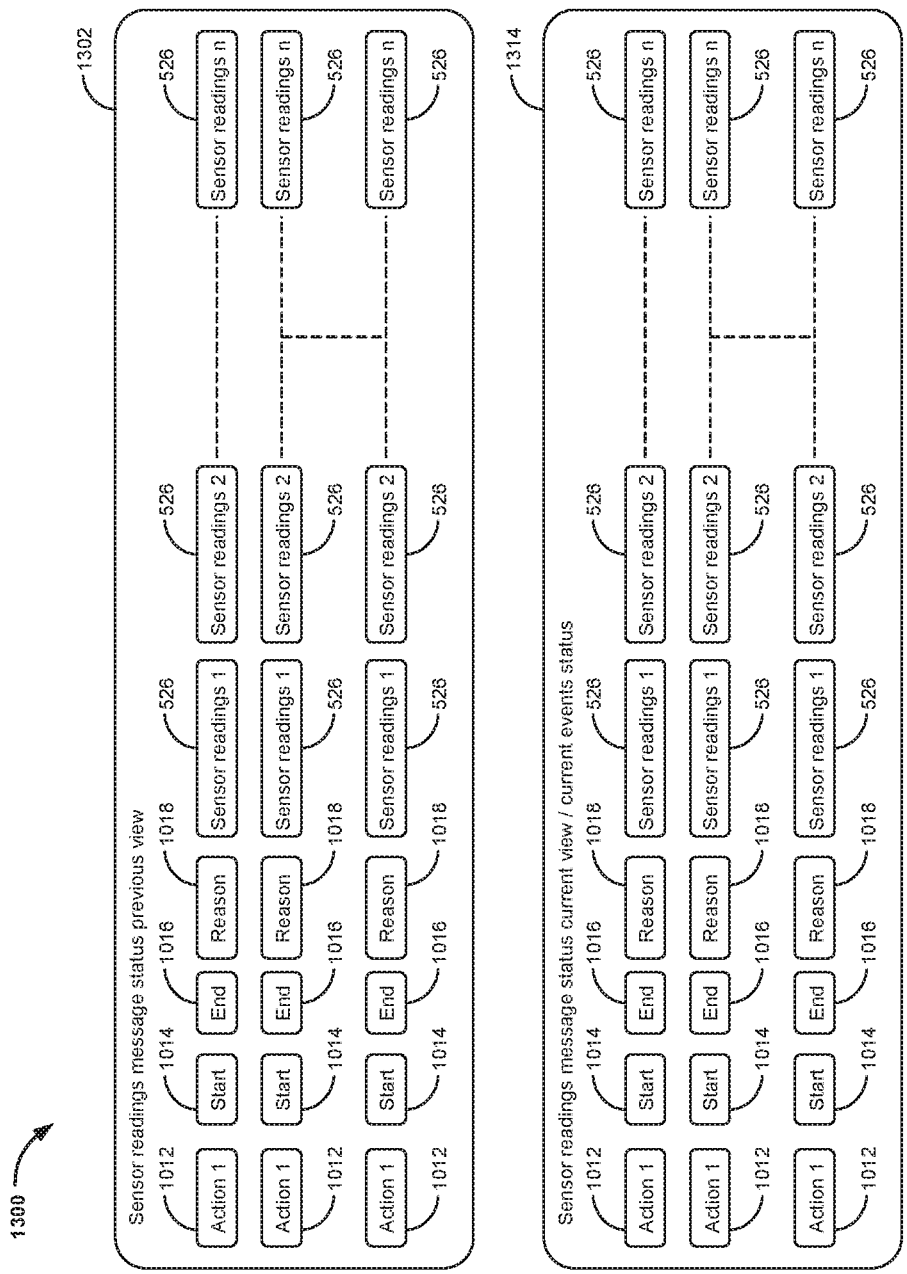
FIG. 13 depicts an embodiment of the Events Database and the Message Status Database structures.

FIG. 13 depicts an embodiment 1300 of the Events Database 612 and the Message Status Database 618 structures. In one embodiment, as disclosed in FIG. 6, the Message Status DB 618 is an accumulation of all sensor events associated with the reporting of scheduled test results. The Sensor Events DB 612 is used to record events in real time such that the information is recorded into the appropriate structures for future messages to be generated. In one embodiment the Message Status Database 618 contains two records. The first record is a Sensor Readings Message Status Previous View 1302, and the second record is the Sensor Readings Message Status Current View/Current Events Status 1314. When reading events are triggered, the appropriate fields in the Readings Message Status Current View/Current Events Status 1314 record are updated. When an Updates message is being sent or before a Baseline message is being sent, the content of the Sensor Readings Message Status Current View/Current Events Status 1314 is copied into the Sensor Readings Message Status Previous View 1302. When a Baseline message is being sent the entire Sensor Readings Message Status Previous View 1302 record is being sent as is. The detailed description of the Sensor Readings Message Status Previous View 1302 and the Readings Message Status Current View/Current Events Status 1314 can be found in FIG. 10 under Baseline or Updates and Sensor Readings Message 1030.

Figure 14:
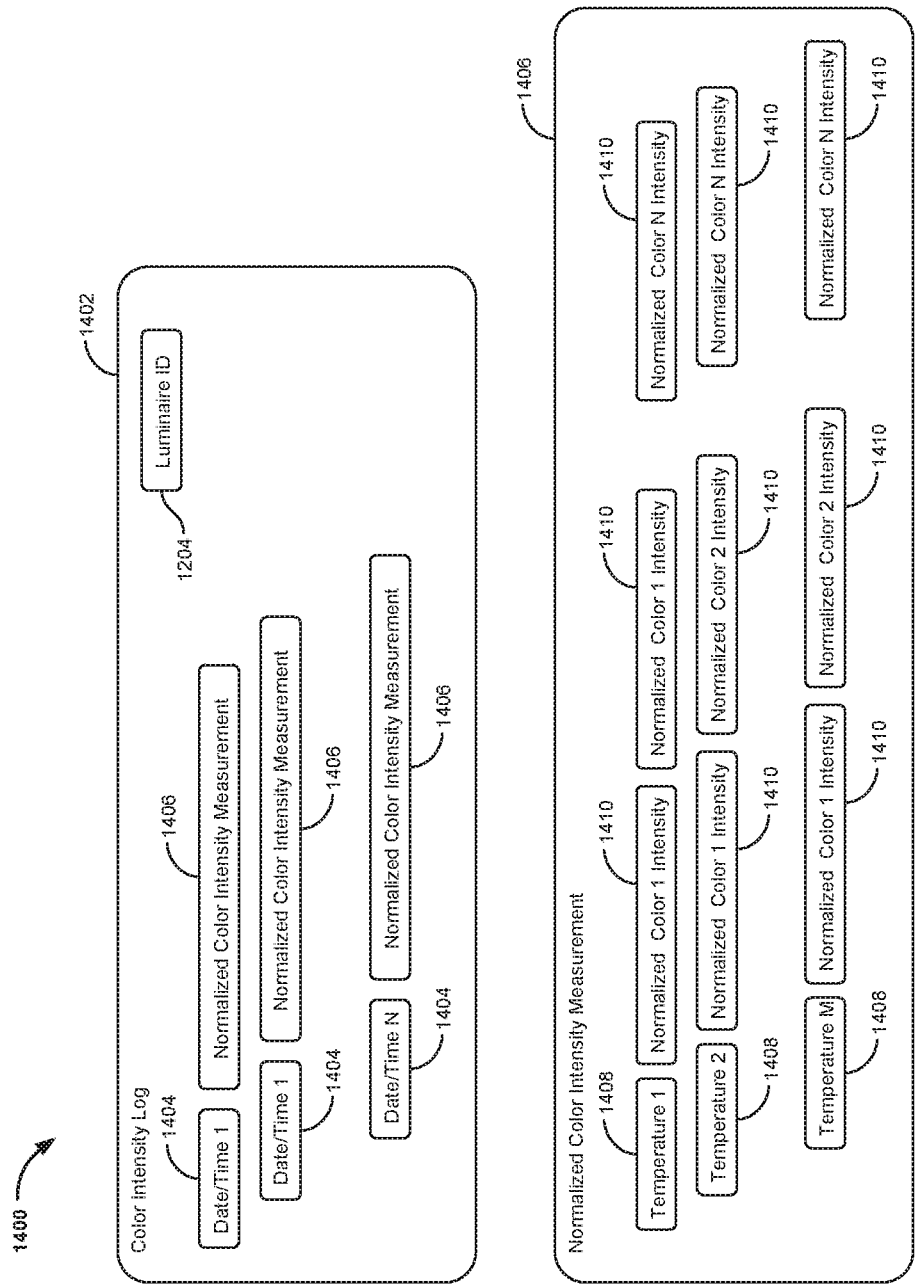
FIG. 14 depicts an embodiment of the Luminaire Half-Life Prediction Database structure; and, FIG. 15 depicts an embodiment of handling the color temperature by the system.

FIG. 14 depicts an embodiment 1400 of the Luminaire Half-Life Prediction Database 810 structure. This Database is a log for all Normalized Color Intensity Measurements per luminaire in the system. Every Color Intensity Log 1402 record (one per luminaire) includes the Luminaire ID 1204 field to uniquely identify the luminaire that this record belongs to. The Color Intensity Log 1402 record is composed of N Normalized Color Intensity Measurement 1406 records one per Date/Time in which this measurement was received. In one embodiment, the Normalized Color Intensity Measurement 1406 record is composed of a list of Temperature fields 1408. The Temperature field 1408 includes the environment temperature in which a measurement was taken and a list of normalized color intensity measurements 1410, one per color being measured in this system.

Figure 15:
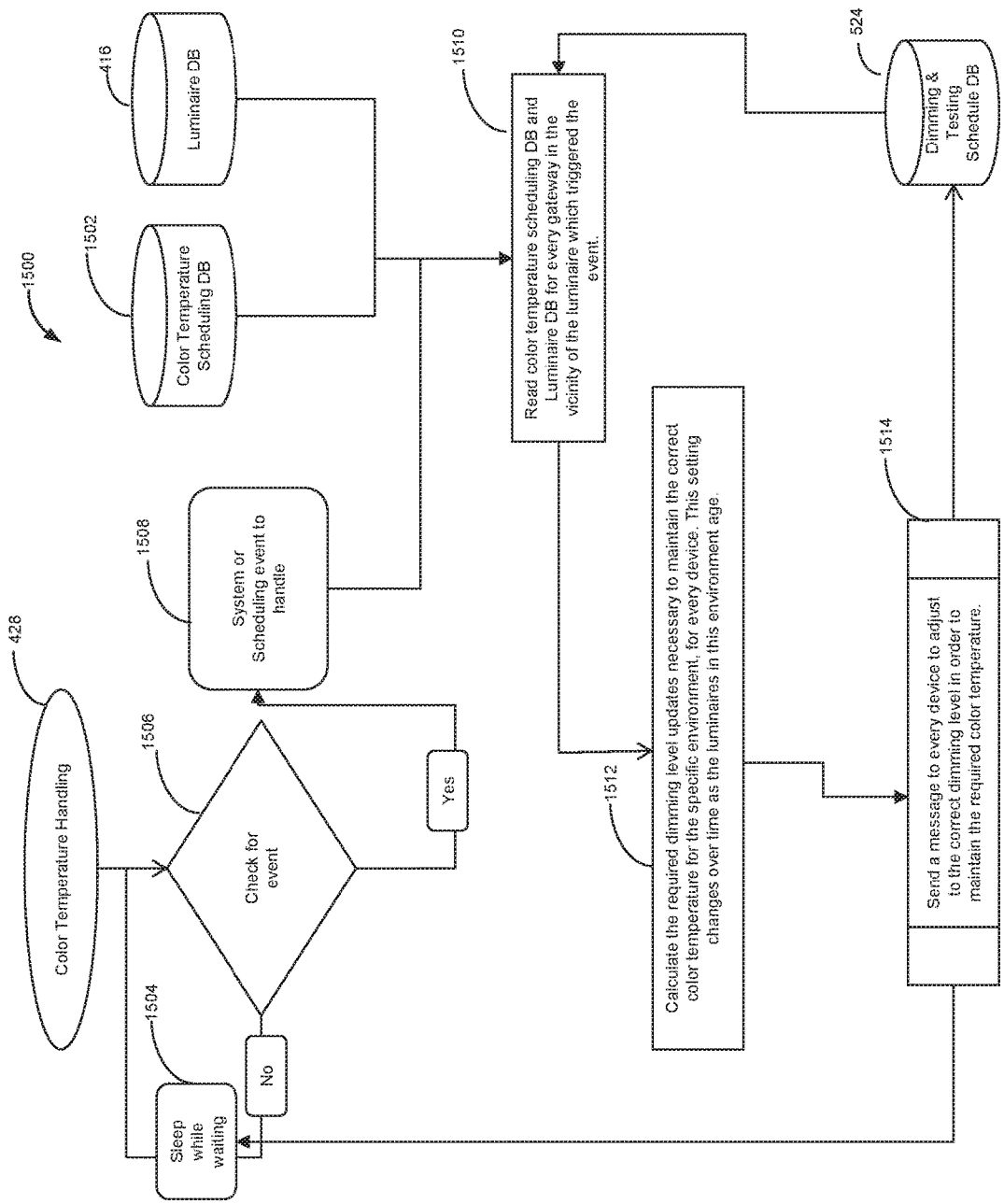

FIG. 15 depicts an embodiment 1500 for handling the color temperature by the system. Color temperature handling process 428 is triggered 1508 by either a scheduling event or by a system update of luminaire sensor information. In step 1506 the process checks for events. If an event is found to exist, it continues to step 1508. Otherwise, the process goes into a short sleep mode 1504 and wakes up later to check for an event. The scheduling event 1508 can be based on the color temperature scheduling database 1502, which is maintained according to user and system specific setups (for example: preferred color temperatures at preferred times). Upon an event, the color temperature handling process will read the 3 databases—the color temperature scheduling database 1502, the Luminaire and Driver DB 416 and the Diming and testing schedule database 524.

Specifically, based upon data provided from any one of databases 1502, 416 or 524, the system can conclude that the color temperature needs to be adjusted. At such time, the gateway 102 can control the dimming control to thereby adjust the color temperature of the luminaire.

A change in color temperature in a room or area local to a luminaire can be a result of a dimming schedule or testing schedule event. For example, an environmental change such as illumination due to a change in luminaire dimming level(s) in one location can trigger a color temperature change at a different location. The disclosed systems and methods can correlate control between sensors across an entire lighting system and compensate for such change because the color content/intensity of specific luminaires is measured directly using up looking color sensors. For operations depicted in FIG. 15, the system is provided with knowledge about the luminaire based on manufacturing and time as part of the Luminaire and Driver DB 416. This information includes, amongst other things, the color temperature at multiple specific dimming levels. When the system is being initialized, a baseline for sensor readings is established at those specific dimming levels. The correlation between the known measured information received in the Luminaire and Driver DB 416 and the base line sensor readings provides the information needed to maintain color temperatures. In one embodiment where the system is performing a controlled change and testing for a specific luminaire, the handler will ignore the event and will not try to change/adjust the room color temperature. In cases where the system is not experiencing controlled dimming or environment testing event, the color temperature handling process will continue to step 1510 in which it compares the current Luminaire and Driver DB 416 information with the color temperature scheduling information.

In the exemplary embodiments, the color sensor(s) measure color intensity of the luminaire. When the color intensity is outside of a range expected by the sensor, the sensor provides the color intensity readings to the server either directly or via the gateway. The server uses the information to calculate an associated color temperature of the luminaire and determines whether there is a need to change the dimming level such that the required color temperature level is met. In step 1512 the system calculates adjustments when needed per luminaire in the environment of the luminaire that triggered the event. Controlling the environment color temperature by each individual luminaire is possible in part because the exemplary system takes direct light intensity readings at each luminaire and correlates the light intensity of each luminaire to a color temperature. The server converts and correlates light intensity readings to color temperature using a mathematical correlation between, for example, an amount of light in the room as measured by the environment (down looking) sensor; a correlation between light intensity and dimming level of the luminaire at the time of reading versus the light intensity, dimming level, and color temperature of the luminaire at previous readings and/or during installation or initialization of the lighting system; the power consumption of the luminaire; and, the luminaire type and manufacturer. The server uses the correlation of light intensity to color temperature for each luminaire in a particular environment, i.e., space, to determine an overall color temperature of the environment and a correlation between the overall color temperature and light intensity and dimming level of each luminaire. As a result, the system may control the color temperature in an environment by adjustments when needed per luminaire.

In step 1514, if any change is necessary, the color temperature handling process 428 will trigger dimming change request by updating the dimming and testing schedule database 524. The dimming and testing schedule database 524 impacts the operations of the gateway such that every gateway reads its database information, as depicted in FIG. 6, and schedules a change to the luminaire according with its current setup.

The disclosed devices, systems, and methods, in various embodiments, configurations and aspects, includes components, methods, processes, systems and/or apparatuses substantially developed as depicted and described herein, including various embodiments, sub-combinations, and subsets thereof. The disclosed system, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosed embodiments has been presented for purposes of illustration and description. The foregoing is not intended to limit the disclosure to the form or forms disclosed herein. In the foregoing Detailed Description for example, various features of the disclosed system are grouped together in one or more embodiments, configurations, or aspects for the purpose of streamlining the disclosure. The features of the embodiments, configurations, or aspects of the disclosed systems may be combined in alternate embodiments, configurations, or aspects other than those discussed above. This method of disclosure is not to be interpreted as reflecting an intention that the disclosed system requires more features than are expressly recited in each claim. Rather, as the following claims reflect, claimed features may be less than all features of a single foregoing disclosed embodiment, configuration, or aspect. Thus, the following claims are hereby incorporated into this Detailed Description, with each claim standing on its own as a separate embodiment of the disclosed systems and methods.

Moreover, the description of the disclosed system has included descriptions of one or more embodiments, configurations, or aspects, and certain variations and modifications, other variations, combinations, and modifications that are within the scope of the disclosed system and methods. Furthermore, the above disclosure is not limited by the exemplary embodiments and includes alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein.

What is claimed is:

1. A system for controlling luminaire color temperature, comprising:
   a gateway configured to control at least one of a dimming level and a dimming control protocol of at least one of a first luminaire and a second luminaire;
   a sensor subsystem in data communication with the gateway; and
   a server in data communication with the gateway and the sensor subsystem, wherein the sensor subsystem is configured to measure a current color intensity of the first luminaire, the server is configured to calculate a current color temperature of the first luminaire based at least in part on the current color intensity of the first luminaire, and the sensor subsystem is configured to communicate the current color intensity of the first luminaire to the server if the current color intensity of the first luminaire is outside of an expected color intensity range that is expected by the sensor subsystem, based at least in part on a first relationship determined by a comparison of a correlation between the current color intensity of the first luminaire and a current dimming level of the first luminaire and a correlation between a previous color intensity of the first luminaire, a previous dimming level of the first luminaire, and a previous color temperature of the first luminaire,
   wherein the sensor subsystem is further configured to measure a current color intensity of the second luminaire, the server is configured to calculate a current color temperature of the second luminaire based at least in part on the current color intensity of the second luminaire, and the sensor subsystem is configured to communicate the current color intensity of the second luminaire to the server if the current color intensity of the second luminaire is outside of an expected color intensity range that is expected by the sensor subsystem, based at least in part on a second relationship determined by a comparison of a correlation between the current color intensity of the second luminaire and a current dimming level of the second luminaire and a correlation between a previous color intensity of the second luminaire, a previous dimming level of the second luminaire, and a previous color temperature of the second luminaire,
   wherein the server is configured to correlate the first relationship and the second relationship to an overall color temperature of an illuminated environment in which the first luminaire and the second luminaire are installed and determine whether at least one of the current dimming level of the first luminaire, a current dimming control protocol of the first luminaire, the current dimming level of the second luminaire, and a current dimming control protocol of the second luminaire must be adjusted to generate a particular overall color temperature, based at least in part on the correlation between the first relationship and the second relationship to the overall color temperature, and, if so, instruct the gateway to adjust the at least one of the current dimming level of the first luminaire, the current dimming control protocol of the first luminaire, the current dimming level of the second luminaire, and the current dimming control protocol of the second luminaire to achieve the particular overall color temperature, and the gateway is configured to adjust the at least one of the current dimming level of the first luminaire, the current dimming control protocol of the first luminaire, the current dimming level of the second luminaire, and the current dimming control protocol of the second luminaire according to the instructions from the server.

2. The system of claim 1, wherein the server is configured to calculate the current color temperature of the first luminaire based at least in part on a comparison of the current color intensity of the first luminaire and the current dimming level of the first luminaire to an initial color intensity of the first luminaire, an initial dimming level of the first luminaire, and an initial color temperature of the first luminaire.

3. The system of claim 1, wherein the second relationship is different than the first relationship.

4. The system of claim 3, wherein the first relationship and the second relationship respectively are represented by a first dimming curve and a second dimming curve, and the first dimming curve is different than the second dimming curve.

5. The system of claim 1, wherein the server is further configured to calculate at least one of a half-life or end of life for the first luminaire based at least in part on at least one of a color intensity change over time of the first luminaire, a color temperature change over time of the first luminaire, and a comparison of the current color intensity of the first luminaire and the current dimming level of the first luminaire to a previous color intensity of the first luminaire and a previous dimming level of the first luminaire.

6. The system of claim 5, wherein the color temperature change over time of the first luminaire is determined by comparing the current color temperature of the first luminaire to at least one of a previously calculated color temperature of the first luminaire and the correlation between the previous color temperature of the first luminaire, the previous dimming level of the first luminaire, and the previous color intensity of the first luminaire.

7. The system of claim 6, wherein the server is further configured to instruct the gateway to adjust at least one of the current dimming level of the first luminaire and the current dimming control protocol of the first luminaire to maintain a constant color temperature or range of color temperatures of the first luminaire, based at least in part on the calculated half-life or end of life.

8. The system of claim 5, wherein the previous color intensity of the first luminaire is an initial color intensity of the first luminaire and the previous dimming level of the first luminaire is an initial dimming level of the first luminaire.

9. The system of claim 5, wherein the previous color intensity of the second luminaire is an initial color intensity of the second luminaire and the previous dimming level of the second luminaire is an initial dimming level of the second luminaire.

10. The system of claim 1, wherein the sensor subsystem includes at least one up looking color sensor configured to measure the color intensity of the first luminaire.

11. A method for controlling luminaire color temperature, comprising:
    measuring with a sensor subsystem a current color intensity of a first luminaire and a current color intensity of a second luminaire;
    transmitting the current color intensity of the first luminaire or the current color intensity of the second luminaire from the sensor subsystem to a server in data communication with the sensor subsystem, if the corresponding current color intensity of the first luminaire or the current color intensity of the second luminaire is outside of an expected color intensity range that is expected by the sensor subsystem, based at least in part on a first relationship determined by a comparison of a correlation between the current color intensity of the first luminaire and a current dimming level of the first luminaire and a correlation between a previous color intensity of the first luminaire, a previous dimming level of the first luminaire, and a previous color temperature of the first luminaire, and a second relationship determined by a comparison of a correlation between the current color intensity of the second luminaire and a current dimming level of the second luminaire and a correlation between a previous color intensity of the second luminaire, a previous dimming level of the second luminaire, and a previous color temperature of the second luminaire;
    correlating the first relationship and the second relationship to an overall color temperature of an illuminated environment in which the first luminaire and the second luminaire are installed;
    calculating with the server at least one of a current color temperature of the first luminaire, based at least in part on the current color intensity of the first luminaire, and a current color temperature of the second luminaire, based at least in part on the current color intensity of the second luminaire;
    determining with the server whether at least one of the current dimming level of the first luminaire, a current dimming control protocol of the first luminaire, the current dimming level of the second luminaire, and a current dimming control protocol of the second luminaire must be adjusted to generate a particular overall color temperature, based at least in part on the correlation between the first relationship and the second relationship to the overall color temperature, and, if so, instructing a gateway, by the server, to adjust at least one of the current dimming level of the first luminaire, the current dimming control protocol of the first luminaire, the current dimming level of the second luminaire, and the current dimming control protocol of the second luminaire; and
    adjusting with the gateway at least one of the current dimming level of the first luminaire, the current dimming control protocol of the first luminaire, the current dimming level of the second luminaire, and the current dimming control protocol of the second luminaire according to the instructions from the server.

12. The method of claim 11, wherein calculating current color temperature of the first luminaire is based at least in part on comparing the current color intensity of the first luminaire and the current dimming level of the first luminaire to an initial color intensity of the first luminaire, an initial dimming level of the first luminaire, and an initial color temperature of the first luminaire.

13. The method of claim 12, further comprising calculating at least one of a half-life or end of life for the first luminaire based at least in part on at least one of a color intensity change over time of the first luminaire, a color temperature change over time of the first luminaire, and comparison of the current color intensity of the first luminaire and the current dimming level of the first luminaire to a previous color intensity of the first luminaire and a previous dimming level of the first luminaire.

14. The method of claim 13, wherein the color temperature change over time of the first luminaire is determined by comparing the current color temperature of the first luminaire to at least one of a previously calculated color temperature of the first luminaire and the correlation between the previous color temperature of the first luminaire, the previous dimming level of the first luminaire, and the previous color intensity of the firsts luminaire.

15. The method of claim 14, further comprising instructing the gateway, by the server, to adjust at least one of the current dimming level of the first luminaire and the current dimming control protocol of the first luminaire to maintain a constant color temperature or range of color temperatures of the first luminaire, based at least in part on the calculated half-life or end of life.

16. The method of claim 13, wherein the previous color intensity of the first luminaire is an initial color intensity of the first luminaire and the previous dimming level of the first luminaire is an initial dimming level of the first luminaire.

17. The method of claim 13, wherein the previous color intensity of the second luminaire is an initial color intensity of the second luminaire and the previous dimming level of the second luminaire is an initial dimming level of the second luminaire.

* * * * *